(12) United States Patent
Ott

(10) Patent No.: US 12,429,570 B2
(45) Date of Patent: Sep. 30, 2025

(54) DISTORTION DETERMINATION APPARATUS AND METHOD OF DETERMINING A DISTORTION

(71) Applicant: Melexis Technologies NV, Tessenderlo (BE)

(72) Inventor: Andreas Ott, Erfurt (DE)

(73) Assignee: MELEXIS TECHNOLOGIES NV, Tessenderlo (BE)

( * ) Notice: Subject to any disclaimer, the term of this patent is extended or adjusted under 35 U.S.C. 154(b) by 1073 days.

(21) Appl. No.: 17/409,968

(22) Filed: Aug. 24, 2021

(65) Prior Publication Data

US 2022/0066004 A1    Mar. 3, 2022

(30) Foreign Application Priority Data

Aug. 26, 2020 (EP) .................................... 20192948

(51) Int. Cl.
| | | |
|---|---|---|
| G01C 3/08 | (2006.01) | |
| G01S 7/497 | (2006.01) | |
| G01S 17/58 | (2006.01) | |
| G01S 17/894 | (2020.01) | |

(52) U.S. Cl.
CPC .............. *G01S 7/497* (2013.01); *G01S 17/58* (2013.01); *G01S 17/894* (2020.01)

(58) Field of Classification Search
CPC ......... G01S 7/497; G01S 17/894; G01S 17/58
See application file for complete search history.

(56) References Cited

U.S. PATENT DOCUMENTS

| | | | |
|---|---|---|---|
| 9,785,824 B2 | 10/2017 | Gruenwald | |
| 11,885,880 B2* | 1/2024 | Xu | ........................ H04N 13/254 |
| 2012/0013887 A1* | 1/2012 | Xu | ........................ G01S 17/894 |
| | | | 356/4.02 |
| 2017/0205497 A1 | 7/2017 | Dorrington et al. | |
| 2021/0166407 A1* | 6/2021 | Chen | ........................ G06T 7/55 |

OTHER PUBLICATIONS

European Search Report for European U.S. Appl. No. 20/192,948 dated Dec. 18, 2020.

\* cited by examiner

*Primary Examiner* — Mark Hellner
(74) *Attorney, Agent, or Firm* — Harness, Dickey & Pierce, P.L.C.

(57) ABSTRACT

A motion or saturation determination apparatus (100) comprising: a light source configured to emit light and an optoelectronic device (102) configured to receive an electromagnetic signal and to translate the signal to a plurality of electrical output signals corresponding to a plurality of predetermined phase offset values in accordance with an indirect time of flight measurement technique. A signal processing circuit (110, 116, 126, 132, 136) of the apparatus (100) is configured to process the electrical output signals to calculate a plurality of measurement vectors derived from the plurality of electrical signals. The vectors are in respect of a plurality of frequencies and comprise a first measurement vector for a fundamental harmonic frequency and a second measurement vector for a non-fundamental frequency. The circuit (110, 116, 126, 132, 136) is configured to calculate a scalar relating a first amplitude of the first vector to a second amplitude of the second vector, and to use the scalar to identify motion or saturation in respect of the optoelectronic device (102).

15 Claims, 20 Drawing Sheets

DISTORTION DETERMINATION APPARATUS AND METHOD OF DETERMINING A DISTORTION

FIELD

The present invention relates to a distortion determination apparatus of the type that, for example, employs an indirect time of flight measurement technique. The present invention also relates to a method of determining a distortion, the method being of the type that, for example, employs an indirect time of flight measurement technique.

BACKGROUND

In so-called time-of-flight sensing systems and other systems, for example gaming console vision systems, it is known to employ an illumination source to illuminate a surrounding environment within a field of view of the illumination source, sometimes known as a "scene", and process light reflected by features of the scene. Such so-called LiDAR (Light Detection And Ranging) systems illuminate a scene with light using the illumination source, and detect light reflected from an object in the scene using a detection device, for example an array of photodiodes, some optical elements and a processing unit. Light reflected from the object in the scene is received by the detection device and converted to an electrical signal, which is then processed by the processing unit by application of a time-of-flight (ToF) calculation in order to determine the distance of the object from the detection device. Although different varieties of LiDAR system are known to be based upon different operating principles, such systems nevertheless essentially illuminate a scene and detect reflected light.

In this regard, the so-called "Flash LiDAR" technique, which is a direct ToF ranging technique, employs a light source that emits pulses of light that are subsequently reflected by features of the scene and detected by a detector device. In such a technique, the distance to a reflecting feature is calculated directly using a measured time for a pulse of light to make a round trip to the reflecting feature and back to the detector device. The pulses of light incident upon the detector devices are sampled in the time domain at a very high sampling rate. The signal path in the processing circuitry to implement such a technique therefore requires a high bandwidth for signals as well as a large silicon "real estate", i.e. such an implementation requires a relatively large area on a silicon wafer, which in turn limits the number of channels that can be supported on an integrated circuit. The practical spatial number of channels that such Flash LiDAR sensors can support is therefore usually below 100. To overcome this limitation, mechanical scanning systems are implemented requiring moving components.

Another known LiDAR system employs a so-called "indirect Time of Flight" (iToF) ranging technique. iTOF systems emit a continuous wave light signal and reflections of the continuous wave light signal are received by a detector device and analysed. Multiple samples, for example four samples, of the light reflected from a feature of the scene are taken over a frame cycle, each sample being phase stepped by, for example, 90°. Using this illumination and sampling approach, a phase angle between illumination and reflection can be determined, and the determined phase angle can be used to determine a distance to the reflecting feature of the scene.

In iToF systems, high frequency signal processing (demodulation) occurs at the pixel level, and so the signal bandwidth post-pixel required to integrate a large number of pixels on the same chip is low. Consequently, iToF systems can support a larger number of channels and hence higher spatial resolution measurement than direct ToF systems.

However, iToF systems are sensitive to movement of an object in a scene over the measurement frame cycle, which can result in the generation of so-called "motion artefacts" in a captured image. For an iToF system making measurements at a rate of 50 frames-per-second using a four phase scheme and a modulation frequency of 20 MHz, an object moving at 3.75 ms$^{-1}$ reaches a 1% error budget for unambiguous range calculations. When an object moves in a direction transverse to the scene, the time-of-flight measured and thus the distance can vary in respect of movement occurring between two consecutive phase offsets within a measurement frame. As such, the above specified iToF system could measure an object speed of 200 ms$^{-1}$ when the object is 1 metre in front of the background of the scene. Such speeds result in motion artefacts, especially at the edges of an object moving transversely to an iToF camera.

Although motion detection can be performed by comparing a phase angle or calculated distance of each pixel of one frame cycle with the phase or calculated distance of a preceding frame cycle, a frame buffer is required. Additionally, such a process introduces delay owing to the need to compare measurement results of two consecutive frame cycles.

U.S. Pat. No. 9,785,824 describes an iToF that employs an illumination signal having an even duty cycle and uses analysis of even harmonics of a received signal in order to identify motion. At least one even harmonic frequency bin is compared with a threshold value in order to detect motion artefacts. However, when a duty cycle other than 0.5 duty cycle is employed, the level of the even harmonics bin rises, irrespective of whether or not the level change was caused by motion artefacts. In this regard, limitation to the use of a pulse width symmetric waveform is undesirable as pulse width asymmetric waveforms are required for some applications. For example, US patent publication no. 2017/205497 describes a technique to suppress odd harmonics, such as the fifth harmonic, in an iToF system by way of using pulse width asymmetric waveforms in order to reduce the occurrence of circular errors. However, such a technique introduces additional power into even harmonics. As such, motion artefacts cannot therefore be easily determined using the technique of U.S. Pat. No. 9,785,824 when pulse width asymmetric waveforms are employed. US 2012/013887 A1 relates to an iToF system employing an odd number of phase offset values in order to mitigate so-called wiggling effects.

Another form of distortion from which iToF systems suffer is saturation, which occurs when reflected light intensity is at an upper end of an available dynamic range of the iToF system. Harmonics of a strong received signal alias back to a desired signal (corresponding to the fundamental frequency) with an increased power leading to errors in the calculation of the extracted phase angle and consequently a calculated range.

SUMMARY

According to a first aspect of the present invention, there is provided a motion or saturation determination apparatus comprising: a light source configured to emit light in accordance with an indirect time of flight measurement technique; an optoelectronic device configured to receive an electromagnetic signal and to translate the electromagnetic signal to a plurality of electrical output signals respectively corresponding to a plurality of predetermined phase offset values applied over a frame cycle in accordance with the indirect time of flight measurement technique, the optoelectronic device also being configured to store each of the plurality of electromagnetic signals; a signal processing circuit configured to process the plurality of electrical output signals in accordance with the indirect time of flight measurement technique in order to calculate a plurality of measurement vectors substantially in parallel and derived from the plurality of electrical output signals generated over the frame cycle, the plurality of measurement vectors being in respect of a plurality of frequencies, respectively, and comprising a first measurement vector in respect of a fundamental harmonic frequency and a second measurement vector in respect of a non-fundamental frequency; wherein the signal processing circuit is also configured to calculate a scalar relating a first amplitude of the first measurement vector to a second amplitude of the second measurement vector, and to use the scalar to identify motion or saturation in respect of the optoelectronic device over the frame cycle.

The distortion may be identified by reference to a distortion determination threshold value.

The signal processing circuit may be configured to calculate a compensated second amplitude of the second measurement vector; the calculation of the compensated second amplitude may comprise applying the scalar to the first amplitude of the first measurement vector.

The signal processing circuit may be further configured to subtract the scaled first amplitude from the second amplitude.

The signal processing circuit may be configured to calculate a compensated second amplitude of the second measurement vector; the calculation of the compensated second amplitude may comprise applying the scalar to the second amplitude of the second measurement vector and the signal processing circuit subtracting the first amplitude from the scaled second amplitude.

The signal processing circuit may be configured to estimate a true received intensity in respect of the optoelectronic device; estimation of the true received intensity may comprise applying a reciprocal of the scalar to the second amplitude of the second measurement vector.

According to a second aspect of the invention, there is provided a motion detection apparatus comprising: the motion or saturation determination apparatus as set forth above in relation to the first aspect of the present invention; wherein the non-fundamental harmonic frequency is an even-numbered harmonic frequency; and the signal processing circuit is configured to calculate an absolute value of a result of the subtraction and to compare the absolute value with the distortion determination threshold value.

The distortion determination threshold value may be a predetermined motion threshold value.

The motion detection apparatus may further comprise the signal processing circuit configured to generate a detected motion mask.

According to a third aspect of the invention, there is provided a saturation detection apparatus comprising: the motion or saturation determination apparatus as set forth above in relation to the first aspect of the present invention; wherein the signal processing circuit is configured to compare a result of the subtraction with the distortion determination threshold value.

The distortion determination threshold value may be a predetermined saturation threshold value.

The motion detection apparatus may further comprise the signal processing circuit configured to generate a detected saturation mask.

The optoelectronic device may have a saturation limit associated therewith; and the signal processing circuit may be configured to calculate a saturation threshold value constituting the distortion determination threshold value by calculating an available headroom between the second amplitude and the saturation limit of the optoelectronic device.

According to a fourth aspect of the invention, there is provided a saturation detection apparatus comprising: the motion or saturation determination apparatus as set forth above in relation to the first aspect of the present invention; wherein the optoelectronic device has a saturation limit associated therewith; and the signal processing circuit is configured to calculate a difference between the saturation limit and the true received intensity calculated.

The distortion determination threshold value may be a predetermined saturation threshold value; and the signal processing circuit may be configured to compare the difference calculated with the predetermined saturation threshold value.

According to a fifth aspect of the present invention, there is provided a saturation detection apparatus comprising: the motion or saturation determination apparatus as set forth above in relation to the first aspect of the invention; wherein the signal processing circuit is configured to estimate a true received intensity in respect of the optoelectronic device, estimation of the true received intensity comprising applying a reciprocal of the scalar to the second amplitude of the second measurement vector; the optoelectronic device has a saturation limit associated therewith; and the signal processing circuit is configured to calculate a difference between the first amplitude of the first measurement vector and the true received intensity calculated, thereby providing a measure of saturation.

The apparatus may further comprise a predetermined saturation threshold value for identifying saturation; and the signal processing circuit may be configured to compare the difference calculated with the predetermined saturation threshold value.

The saturation detection apparatus may further comprise the signal processing circuit configured to generate a detected saturation mask.

According to a sixth aspect of the present invention, there is provided a imaging system comprising: an array of optoelectronic devices comprising the optoelectronic device; the saturation detection apparatus as set forth above in relation to the fourth aspect of the present invention, the saturation detection apparatus being configured to detect saturation in respect of each optoelectronic device of the array of optoelectronic devices; wherein the signal processing circuit is configured to execute a first image capture using the array of optoelectronic devices; the signal processing circuit is configured to analyse statistically the differences calculated between the saturation threshold limit and the true received intensity in respect of the array of optoelectronic device s and to identify an area of the array of optoelectronic devices experiencing saturation in respect of the first image capture; and the signal processing circuit is configured to modify a performance parameter associated with the first image capture, and to execute a second image capture implementing the modified performance parameter.

The signal processing circuit may be configured to replace a first number of measurements from the first image capture in respect of the area of the array of optoelectronic devices experiencing saturation with a second number of measurements from the second image capture in respect of the area of the array of optoelectronic devices identified.

The apparatus may further comprise a signal generator configured to generate a carrier signal having an asymmetric pulse width duty cycle. The light source may be configured to use the carrier signal to emit the light. The signal processing circuit may be configured to process the plurality of electrical output signals in accordance with the indirect time of flight measurement technique using the carrier signal.

According to a seventh aspect of the present invention, there is provided a ranging system comprising the motion or saturation determination apparatus as set forth above in relation to the first aspect of the invention, wherein the signal processing circuit is further configured to measure a phase angle of the second measurement vector and to calculate a range using the measured phase angle.

According to a eighth aspect of the present invention, there is provided a method of determining motion or saturation in respect of an optoelectronic device for an indirect time of flight range measurement apparatus, the method comprising: emitting light in accordance with an indirect time of flight measurement technique; generating and storing a plurality of electrical output signals in response to a received optical signal and respectively corresponding to a plurality of predetermined phase offset values applied over a frame cycle in accordance with the indirect time of flight measurement technique; processing the plurality of electrical output signals in accordance with the indirect time of flight measurement technique in order to calculate a plurality of measurement vectors substantially in parallel and derived from the plurality of electrical output signals generated over the frame cycle, the plurality of measurement vectors being in respect of a plurality of frequencies, respectively, and comprising a first measurement vector in respect of a fundamental harmonic frequency and a second measurement vector in respect of a non-fundamental frequency; and calculating a scalar relating a first amplitude of the first measurement vector to a second amplitude of the second measurement vector; and using the scalar to identify motion or saturation in respect of the optoelectronic device over the frame cycle.

It is thus possible to provide an apparatus and method that provides improved motion and/or saturation detection irrespective of the duty cycle of a transient of an illumination signal. The apparatus and method detect motion with improved speed and obviate the use of a frame buffer to detect motion. Consequently, motion artefacts can be detected within a single frame cycle and irrespective of whether even harmonics are present in measurements made. In cases of saturation, it is thus possible to improve measurement dynamic range and enhance image quality.

BRIEF DESCRIPTION OF THE DRAWINGS

At least one embodiment of the invention will now be described, by way of example only, with reference to the accompanying drawings, in which.

DETAILED DESCRIPTION OF THE EXAMPLE EMBODIMENTS

Figure 1:
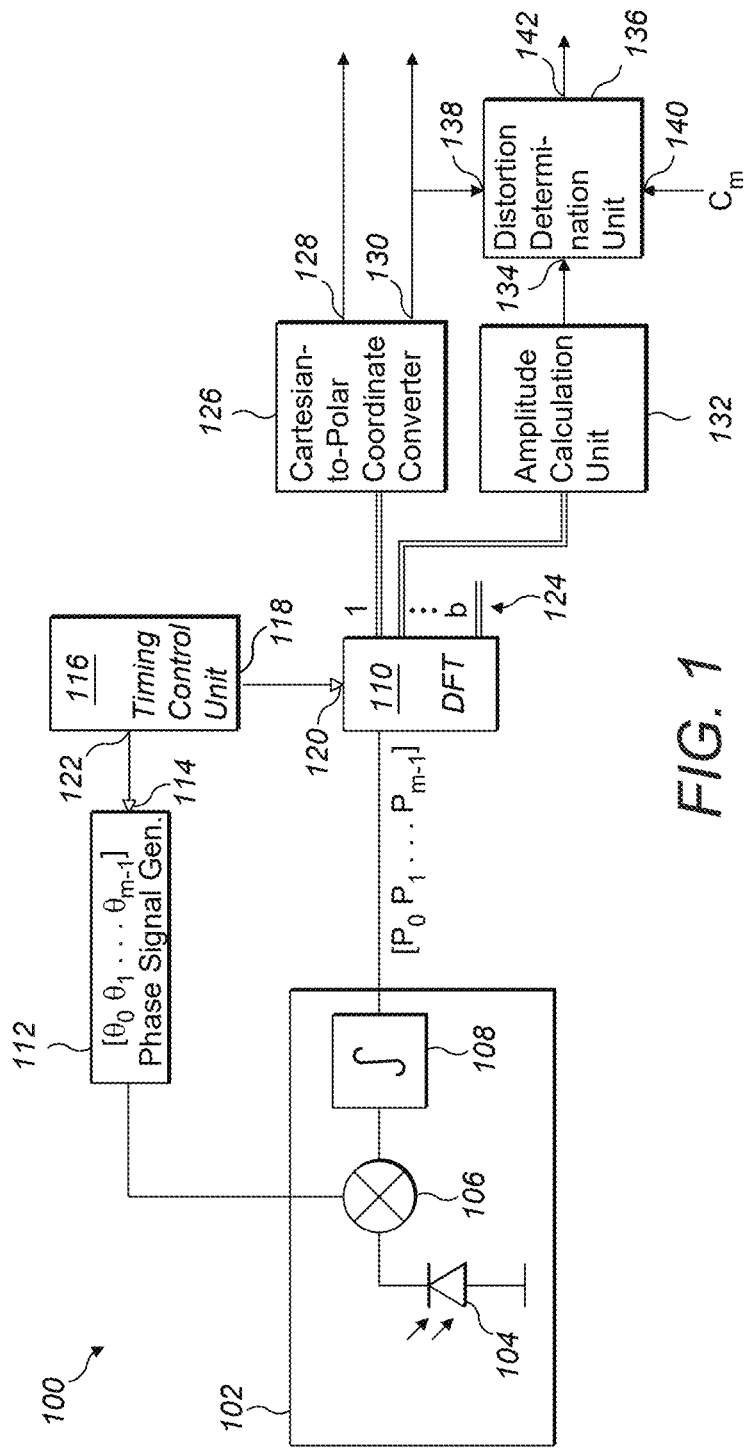
FIG. 1 is a schematic diagram of an indirect time of flight range calculation apparatus comprising a distortion determination apparatus constituting an embodiment of the invention.

Throughout the following description, identical reference numerals will be used to identify like parts.

Referring to FIG. 1, an indirect time of flight range calculation system comprises a source of electromagnetic radiation (not shown), for example a Laser Diode (LD) or a Light Emitting Diode (LED), constituting a light source. In this example, the source of electromagnetic radiation is infrared light that is amplitude modulated in accordance with an indirect time of flight measurement technique so as to be emitted as a continuous wave optical signal. A range calculation apparatus of the system comprises a distortion determination apparatus 100. The distortion determination apparatus 100 comprises an optical receiver photonic mixer pixel device 102, the optical receiver photonic mixer pixel device 102 comprising a photodiode 104 having an anode operably coupled to ground potential and a cathode coupled to a first input of a photonic mixer 106, an output of the photonic mixer 106 being coupled to an input of an integrator 108. In this example, a single photonic mixer pixel device 102 is being described for the sake of conciseness and clarity of description. However, the skilled person will appreciate that the distortion determination apparatus 100 comprises an array of photonic mixer pixel devices 102 of the kind described above. Furthermore, the use of photonic mixer pixel devices described herein is an example of a suitable device structure and the skilled person should appreciate that any suitable optoelectronic device can be employed. In this regard, the suitable optoelectronic device can translate a received optical signal from the optical domain to the electrical domain, select the electrical charge generated over an electrically controlled time period, for example by mixing signals, and accumulate the selected electrical charge. These operations can be performed by a single monolithic device or can be performed by separate connected devices.

A phase signal generator 112 is configured to generate a continuous wave electrical signal having carrier signal having an asymmetric pulse width duty cycle. The phase offset of the continuous wave signal is selectable via a control input 114, the phase of the continuous wave signal being selectable from a set of m phase offsets: $[\theta_0, \theta_1, \ldots, \theta_{m-1}]$. An output of the phase signal generator 112 is coupled to a second input of photonic mixer 106.

An output of the integrator 108 is coupled to an input of a Digital Fourier Transform (DFT) unit 110. In this respect, phase angle measurements are transferred serially to the DFT unit 110, thereby reducing memory requirements for the distortion determination apparatus 100. The DFT unit 110 comprises internal buffers (not shown) to support serial transfer of measurements from the integrator 108. In order to support this arrangement, the DFT unit 110 is operably coupled to a timing control unit 116 to maintain synchronisation of data processing.

The timing control unit 116 has a synchronisation output 118 operably coupled to a timing input 120 of the DFT unit 110. A control output 122 of the timing control unit 116 is coupled to the control input 114 of the phase signal generator 112.

The DFT unit 110 has a plurality of digital in-phase (I)/quadrature (Q) outputs 124. In this example, the DFT unit 110 comprises b pairs of digital I/Q outputs corresponding to different harmonics of measured signals. As the output of the integrator 108 is an accumulated charge and, in this example in the analogue domain, the output of the integrator 108 needs to be converted to the digital domain. This can be achieved, for example, by employing a photon counter instead of the photonic mixer device 102 and the integrator 108 or providing an analogue-to-digital converter before the DFT unit 110.

A first pair of I/Q outputs of the plurality of digital I/Q outputs 124, relating to the first harmonic, or fundamental, frequency of a received reflected optical signal, is coupled to a phase angle calculation unit, for example a cartesian-to-polar coordinate system converter 126. In this example, cartesian-to-polar coordinate converter 126 comprises an arctan unit in respect of phase angles and a first amplitude calculation unit, such as a Euclidean norm or so-called Taxicab norm calculation unit. The cartesian-to-polar coordinate converter 126 comprises a phase angle output 128 operably coupled to the arctan unit and an amplitude output 130 operable coupled to the first amplitude calculation unit.

A second pair of I/Q outputs of the plurality of digital I/Q outputs 124, relating to a higher order even harmonic frequency signal, for example a second order harmonic, is coupled to an input of a second amplitude calculation unit 132, for example a Euclidean norm or so-called Taxicab norm calculation unit. An output of the second amplitude calculation unit 132 is coupled to a first input 134 of a distortion determination unit 136, a second input 138 of the distortion determination unit 136 being coupled to the amplitude output 130 of the cartesian-to-polar coordinate system converter 126. A third input 140 of the distortion determination unit 136 is a motion threshold input configured to receive a distortion determination threshold value, which in this example is a motion threshold value, $C_m$. The distortion threshold value, in this example the motion threshold value, $C_m$, can be predetermined and apply to one or more photonic mixer pixel devices, for example all photonic mixer pixel devices. In some examples, the motion threshold value, $C_m$, can be recalculated during use of the system, for example by higher-level processing (not shown). In this regard, system parameters, for example integration time and illumination power, can change during operation of the system, thereby necessitating the recalculation, which can be based on these parameters. The skilled person should also appreciate that other factors affect calculation of the motion threshold value, $C_m$, and hence recalculation thereof, for example dynamic range and/or decision reliability; the latter can require empirical adjustment of the motion threshold value, $C_m$. The recalculation can become necessary in response to modification of one or more measurement parameter, for example integration time or illumination power. The distortion threshold value can be stored in a digital memory (not shown) of the apparatus 100 and used when required. The distortion determination unit 136 also comprises a distortion detection output 142, for example a motion detection output.

In this example, the DFT unit 110, the cartesian-to-polar coordinate system converter 126, the second amplitude calculation unit 132 and the distortion determination unit 136 constitute a signal processing circuit.

Figure 2:
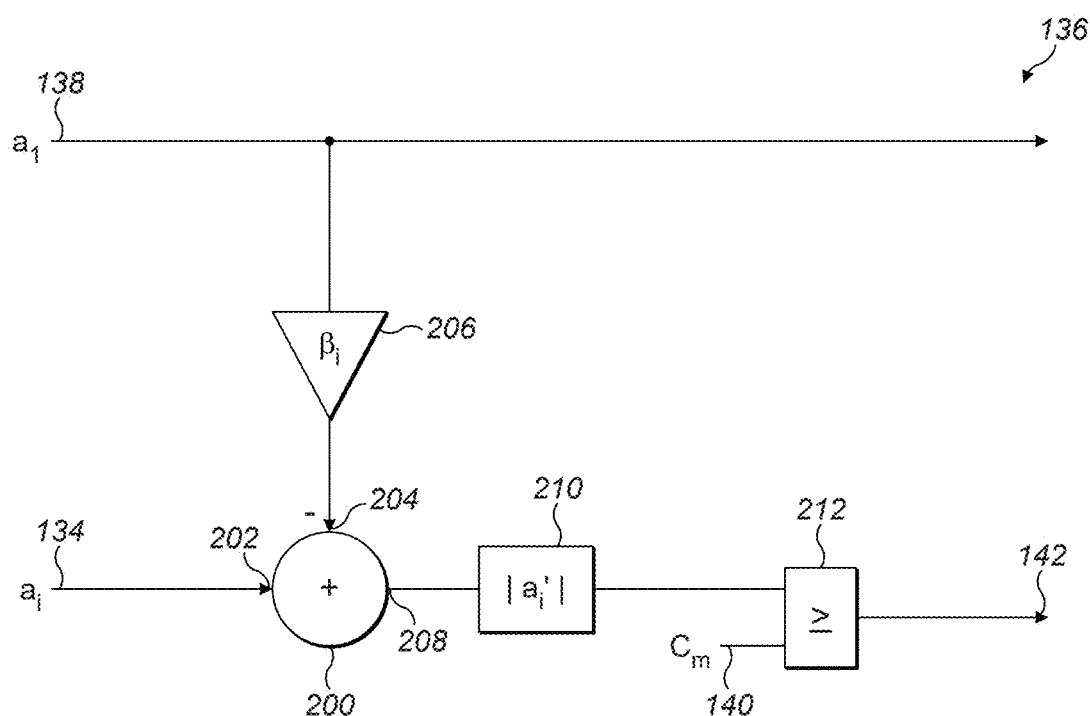
FIG. 2 is a schematic diagram of a motion detection unit of the apparatus of FIG. 1.

Turning to FIG. 2, the distortion determination unit 136, constituting a motion artefact detection apparatus, comprises a first summation unit 200 having a first input 202 coupled to the first input 134 of the distortion determination unit 136. A second, sign-inverting, input 204 of the first summation unit 200 is coupled to an output of a scaling unit 206, an input of the scaling unit 206 being coupled to the second input 138 of the distortion determination unit 136. An output 208 of the first summation unit 200 is coupled to an input of an absolute value calculator 210. An output of the absolute value calculator 210 is coupled to a first input of a first comparator 212, a second input of the first comparator 212 being coupled to the third input 140 of the distortion determination unit 136. An output of the first comparator 212 is coupled to the distortion detection output 142 of the distortion determination unit 136.

In operation (FIG. 3), the light source emits a continuous wave optical signal that illuminates (Step 300) a scene. In this example, the light source uses the carrier signal generated by the phase signal generator 112. An object in the scene, for example, reflects the emitted optical signal. The phase signal generator 112 generates a continuous wave electrical signal, the timing control unit 116 controlling cycling through the set of phase offsets in respect of the electrical signal relative to the continuous wave optical signal. A synchronisation signal is also applied by the synchronisation output 118 to the DFT unit 110.

In order to detect distortion in respect of the photonic mixer pixel device 102, a phase angle and amplitudes are calculated by applying the electrical carrier signal generated by the phase signal generator 112 to the photonic mixer 106 and the phase offset of the electrical signal is cycled through the set of phase offsets mentioned above. Digital representations of the charges stored in the integrator 108 in respect of each phase offset of the set of phase offsets are measured (Step 302) and received by the DFT unit 110 in series and converted (Step 304) to a first pair of I/Q outputs constituting a first I/Q vector, $V_1$, in the complex domain and a second pair of I/Q outputs constituting a second I/Q vector, $V_2$, in the complex domain. In this respect, the integrator 108 provides a plurality of per-phase offset amplitude measurement outputs in series representing respective accumulated charge levels for applied phase offset values in respect of the photonic mixer pixel device 102. The DFT unit 110 calculates, for each frame cycle, intermediate I and Q values for phase-separated amplitude measurements respectively received in series, which are accumulated over a frame cycle to generate final I and Q value results. Operation of such an arrangement comprises vectors being calculated iteratively using the DFT unit 110 in respect of each incoming phase angle measurement.

After the electrical measurement signals are converted to the frequency domain, the I- and Q-values for the fundamental frequency and the second order harmonic frequency are provided by the DFT unit 110 at the outputs thereof. In this example, the synchronisation signal ensures that the fundamental frequency I/Q outputs and the second order harmonic I/Q outputs of a current measurement frame of the DFT unit 110 are synchronously received by the cartesian-to-polar converter 126 and the second amplitude calculation unit 132. The cartesian-to-polar converter 126 then, in accordance with the indirect time of flight measurement technique, calculates (Step 306) an angle of the first vector, $V_1$, constituting an extracted (measured) calculated phase angle, $\varphi_{meas}$, in the complex plane from the fundamental frequency I and Q values. The cartesian-to-polar converter 126 also calculates (Step 308) an amplitude of the first vector, $V_1$, constituting a first extracted (measured) calculated amplitude, $a_1$, in the complex plane from the fundamental frequency I and Q values.

Substantially simultaneously, the second amplitude calculation unit 132 calculates (Step 310) an amplitude of the second vector, $V_2$, constituting a second extracted (measured) calculated amplitude, $a_2$, in the complex plane from the second harmonic frequency I and Q values.

It has been discovered that analysis of amplitudes of output vectors in the complex domain in respect of even-numbered harmonics of the electrical output signal originating from the output of the integrator 108 following compensation provides an indication of distortion, for example motion or saturation, in a scene irrespective of the duty cycle of the continuous wave optical signal emitted by the source of electromagnetic radiation mentioned above. Indeed, as will be explained in further detail later herein, the use of harmonic frequency signals is not limited to even numbered harmonic frequencies for some applications. It should also be appreciated that in some examples the $0^{th}$ harmonic frequency signal can constitute an even numbered harmonic frequency signal, and in some examples can be employed.

In general terms, a Fourier expansion coefficient for an $i^{th}$ harmonic of a rectangular pulse can be written as:

$$a_1 = \frac{2A}{i\pi}\sin(i\pi D) \qquad (1)$$

Using equation (1) above, the relationship between the amplitude in respect of the fundamental frequency of the pulse and a higher order harmonic can be written as:

$$\beta_i = \frac{a_i}{a_1} = \frac{\sin(i\pi D)}{i\sin(\pi D)} \qquad (2)$$

Considering the above relationship (2) in respect of even-numbered harmonics, for example the second order harmonic frequency, the relationship between sine and cosine trigonometric functions can be used to re-write the above expression (2) as:

$$\beta_2 = \frac{a_2}{a_1} = \cos(\pi D) \qquad (3)$$

As can be seen from equation (1), the amplitudes in respect of even harmonic frequencies are 0 when the duty cycle, D, is 0.5. However, for duty cycles other than 0.5, this is not the case. In this regard, as shown above, the amplitude of the even harmonic frequency signals in respect of optical power received by the photonic mixer pixel device 102 is related to the amplitude of the fundamental frequency signal in respect of the optical power received by the factor, $\beta_i$. With particular reference to even-numbered harmonic frequency signals, the factor, $\beta_i$, is nonzero for duty cycles other than 0.5. However, this phenomenon is used to compensate the calculated amplitude of an even-numbered harmonic frequency signal by a scaled amount of the amplitude of the fundamental frequency signal in order to detect distortions. In this respect, the scaling factor, $\beta_i$, can be used to identify a distortion in respect of the photonic mixer pixel device 102. Detection can be achieved by analysis of a compensated amplitude, $a_i'$, of an even-numbered harmonic frequency signal with respect to a zero value, because the compensated amplitude, $a_i'$, of the even-numbered harmonic frequency signal is zero if no further distortions in the scene are occurring or changes are present, for example external forces applied to part or all of the hardware of the system and/or no distortion in the processing of signals. In this regard, where reflected light is received from an object that is suddenly moving in or out of a scene during a frame cycle, the harmonic content of the power of a received optical signal by the photonic mixer pixel device 102 changes and so the compensated amplitude, $a_i'$, becomes nonzero. The compensated amplitude, $a_i'$, is calculated using the following equation:

$$a_i' = a_i - \beta_i a_1 \quad i \in 2N \qquad (4)$$

where i is the number of the harmonic frequency and is even and $a_i$ is therefore the amplitude of the even-numbered harmonic frequency signal. $a_1$ is the amplitude of the fundamental frequency signal. In one example, the scaling factor, $\beta_i$, can be predetermined and stored in the digital memory of the apparatus 100 during factory calibration using a calibration scene. In other examples, the scaling factor, $\beta_i$, can be determined in the field during use, for example upon powering up the apparatus 100.

Figure 3:
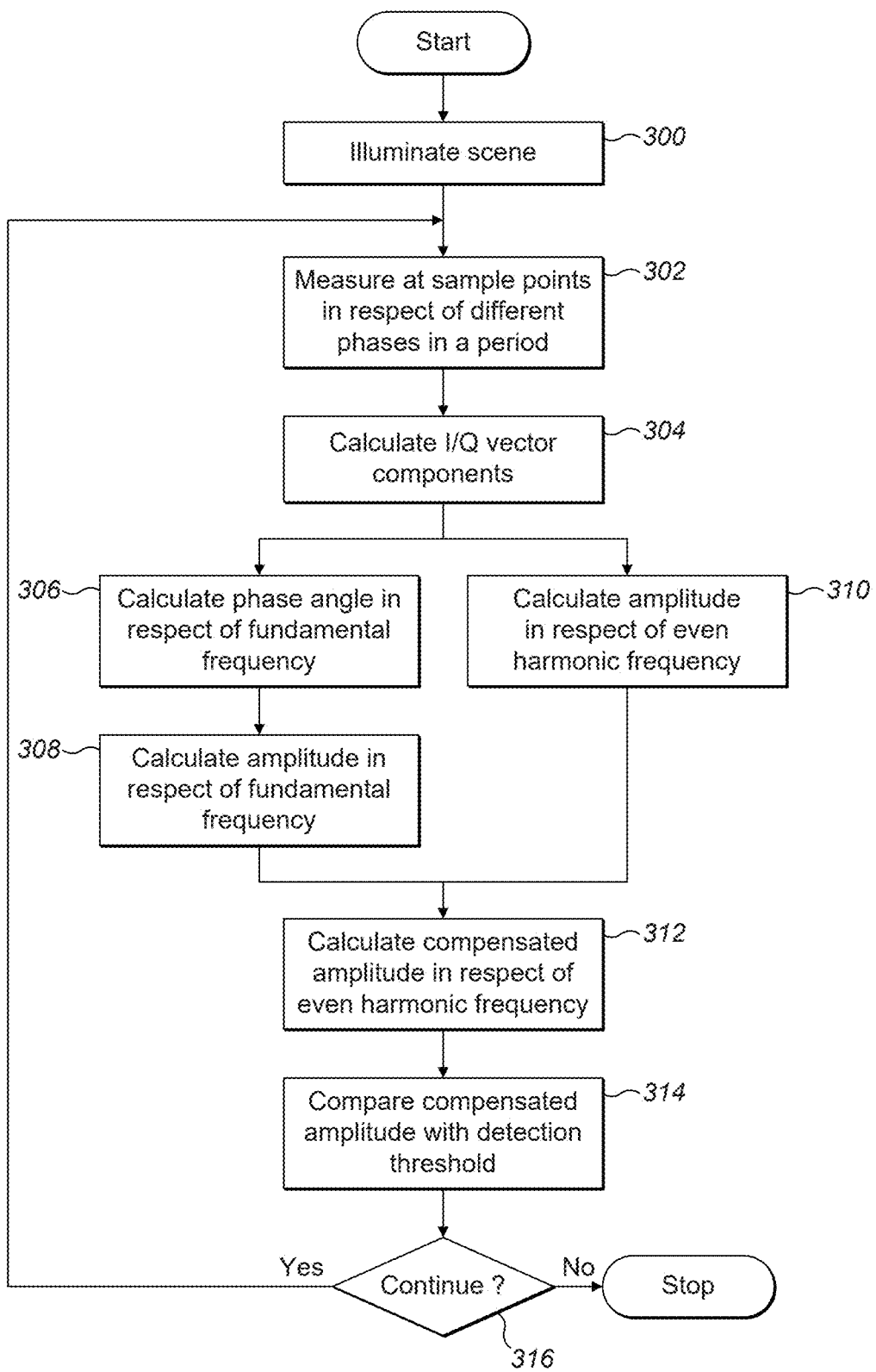
FIG. 3 is a flow diagram of a method of range calculation comprising detection of a distortion constituting another embodiment of the invention.
Figure 4:
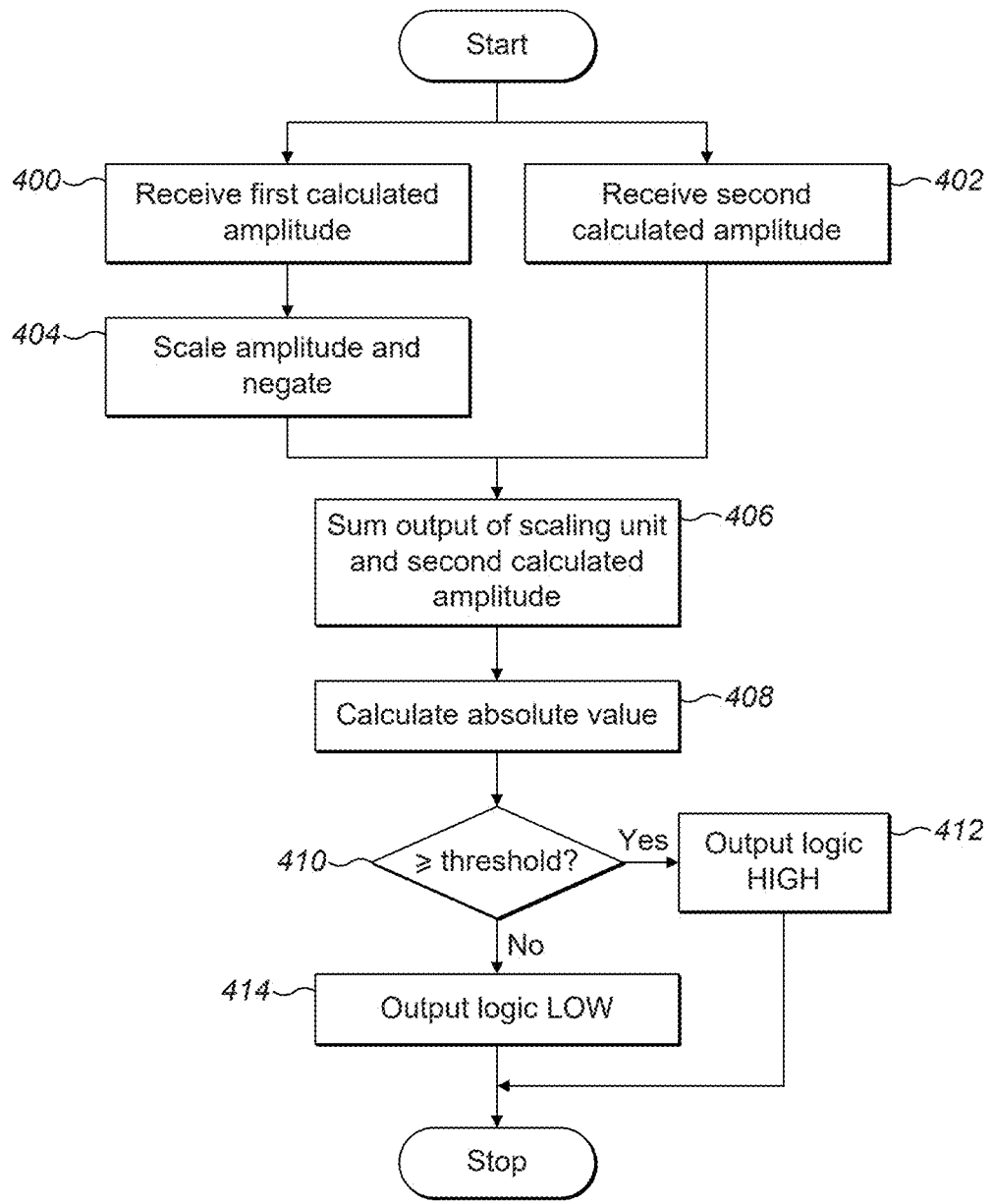
FIG. 4 is a flow diagram of a method of detection of motion of the flow diagram of FIG. 3 and performed by the motion detection unit of FIG. 2.

Referring to FIG. 4, and with additional reference to FIGS. 2 and 3, the distortion determination unit 136 receives (Step 400) the first calculated amplitude, $a_1$, from the cartesian-to-polar converter 126 at the second input 138 thereof and the second calculated amplitude, $a_2$, (Step 402) from the second amplitude calculation unit 132 at the first input 134 thereof. The scaling unit 206 receives the first calculated amplitude, $a_1$, via the second input 138 of the distortion determination unit 136 and scales (Step 404) the first calculated amplitude, $a_1$, by the scaling factor, $\beta_i$. In the current example, where the second harmonic frequency signal is being employed to detect distortion, the scaling factor is $\beta_2$. As such, the first calculated amplitude, $a_1$, is scaled by the scaling factor, $\beta_2$, in respect of the relationship between the amplitude of the fundamental frequency signal and the amplitude of the second order harmonic frequency signal. The scaled first calculated amplitude, $\beta_2 a_1$, is then received at the second, sign-inverting, input 204 of the first summation unit 200, the second calculated amplitude, $a_2$, being received by the first summation unit 200 via the first input 134 of the distortion determination unit 136.

The summation unit 200 then sums (Step 406) the second calculated amplitude, $a_2$, and the sign-inverted scaled first calculated amplitude, $\beta_2 a_1$. The result of the sum (effectively a subtraction), i.e. the output of the first summation unit 200 constitutes calculation (Step 312) of the compensated amplitude, $a_2'$, and is received by the absolute value calculator 210 and the absolute value of the output from the first summation unit 200 is calculated (Step 408). The first comparator 212 then receives the output of the absolute value calculator 210, which is the absolute value of the subtraction of the scaled first calculated amplitude, $\beta_2 a_1$, from the second calculated amplitude, $a_2$. The first comparator 212 then compares (FIG. 3: Step 314) the output of the absolute value received from the absolute value calculator 210 with the motion threshold value, $C_m$, received by the distortion determination unit 136 via the third input 140 thereof. In this example and as shown in greater detail in FIG. 4, the first comparator 212 compares (Step 410) the received absolute value with the motion threshold value, $C_m$, and if the absolute value is equal to the motion threshold value, $C_m$, or greater than the motion threshold value, $C_m$, the first comparator 212 outputs (Step 412) a motion detection signal, for example a logic HIGH, in respect of the photonic mixer pixel device 102, otherwise the first comparator 212 outputs (Step 414) a logic LOW signal, for example, as the motion detection signal.

Figures 5A, 5B, 5C:
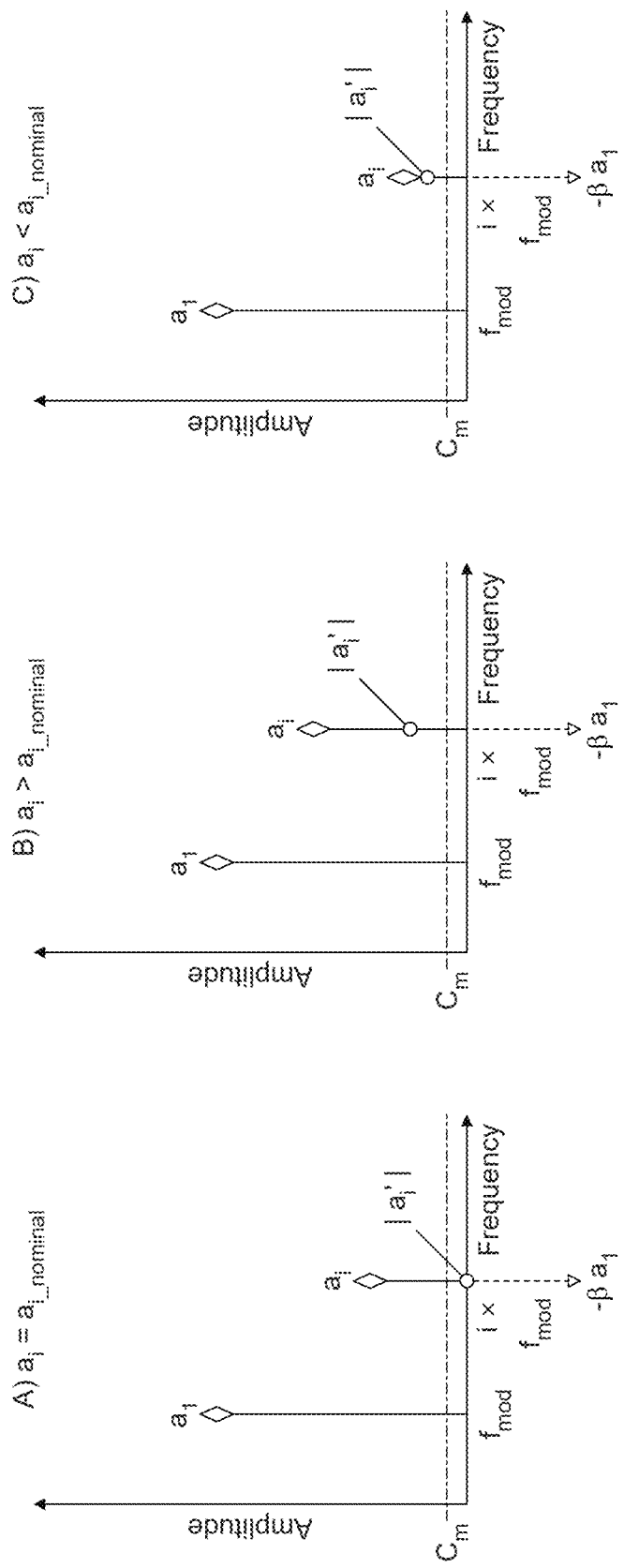
FIGS. 5(a) to (c) are graphs of use cases in relation to the methods of FIGS. 3 and 4.

Referring to FIG. 5(a), an illumination source using a duty cycle, D, other than 0.5, for example 0.4, illuminates an inanimate object in a scene, which reflects illumination light. The phase signal generator 112 also used the same duty cycle, D. The reflected light is received by the photonic mixer pixel device 102 and the first amplitude, $a_1$, and the second amplitude, $a_2$, are generated by the cartesian-to-polar converter 126 and the second amplitude calculation unit 132, respectively, as described above in respect of the fundamental frequency vector, $V_1$, and the second order harmonic vector, $V_2$, output by the DFT unit 110. As the duty cycle, D, is other than 0.5, the second order harmonic signal output by the DFT unit 110 is nonzero even when there is no motion in the scene to detect. Using the scaling factor previously calculated, the absolute value of the compensated second amplitude, $a_2'$, is returned to zero from its uncompensated value to provide a value that can be compared against a threshold value in order to detect motion, where present. From an inanimate object in the scene, subtraction of the scaled first calculated amplitude, $\beta_2 a_1$, from the second calculated amplitude, $a_2$, of the second order harmonic frequency signal yields a zero value or substantially zero value irrespective of the duty cycle, D, of the continuous wave optical signal emitted by the source of electromagnetic radiation mentioned above. In this example, the photonic mixer pixel device 102 is not affected by motion and so the second calculated amplitude, $a_2$, remains at its nominal value. The scaled first calculated amplitude, $\beta_2 a_1$, is therefore the expected value of the second calculated amplitude, $a_2$, and so subtraction yields a zero result. This is lower than the motion threshold value, $C_m$, and so would result in a calculation that no motion has been detected.

Turning to FIG. 5(b), where reflected light received by the photonic mixer pixel device 102 is from a moving object in the scene, assuming the same illumination parameters, the second calculated amplitude, $a_2$, is elevated above a nominal level normally associated with no motion being detected. The compensated second amplitude, $a_2'$, formed from the absolute value of the subtraction of the scaled first calculated amplitude, $\beta_2 a_1$, from the second calculated amplitude, $a_2$, of the second order harmonic frequency signal is therefore nonzero and is above the motion threshold value, $C_m$, and so would result in a finding that the photonic mixer pixel device 102 has been affected by motion.

Referring to FIG. 5(c), assuming the same illumination parameters still, the value of the second calculated amplitude, $a_2$, does not always increase and, in some instances, can decrease when the photonic mixer pixel device 102 is affected by motion. As such, when the scaled first calculated amplitude, $\beta_2 a_1$, is subtracted from the second calculated amplitude, $a_2$, the result can be negative. However, the calculation of the absolute value, which completes the compensation applied to the second calculated amplitude, $a_2$, converts the negative result of the subtraction to a positive result. The compensated second amplitude, $a_2'$, is still nonzero owing to the photonic mixer pixel device 102 being affected by motion and exceeds the motion threshold value, $C_m$, and so would result in a finding that the photonic mixer pixel device 102 has been affected by motion.

The output generated by the first comparator 212 can be used by the system in order to identify one or more regions of a depth map generated by the system comprising motion artefacts. As will be described later herein, where practicable, these regions can be subject to remeasuring, for example by modify one or more parameters relating to the depth measurement.

The above steps (Steps 300 to 314 and 400 to 414) are repeated (Step 316) until generation of depth maps is no longer required.

Figure 6:
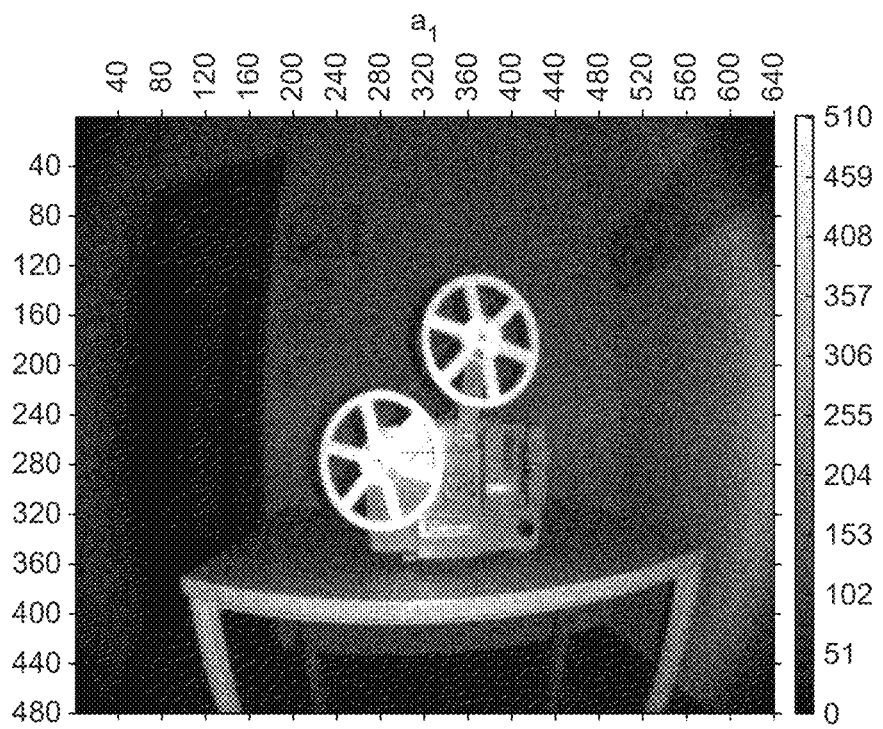
FIG. 6 is a sample image comprising a subject that moves and captured in respect of a fundamental frequency signal by an imaging system comprising the apparatus of FIG. 1.

The effect of the above processing can be better visualised with reference to FIGS. 6 to 9. In this regard, it is assumed that the indirect time of flight range calculation system comprising the distortion determination apparatus 100 includes the necessary functional elements to be used in conjunction with the processing elements described above in order to generate depth maps of a scene, for example a scene comprising a cine projector on a table, the cine projector having film reels that are rotating whilst the depth maps are being generated, the depth maps being generated at a predetermined frame rate, for example 50 frames-per-second. Referring to FIG. 6, an amplitude map recorded in respect of the fundamental frequency signal generated by the DFT unit 110 is captured at an arbitrary point in time when the reels are moving. Although not visible, the amplitude map comprises information that can be used to support identification of motion artefacts in the depth map (not shown). In this example, such information can be used to enable motion artefacts associated with motion of the reels to be detected, which were of course moving at the time the depth map was generated. As such, measurements of depth/range by the photonic mixer pixel devices 102 receiving reflected light from the rotating reels are affected by the motion resulting in a degree of distortion in respect of the reels.

Figure 7:
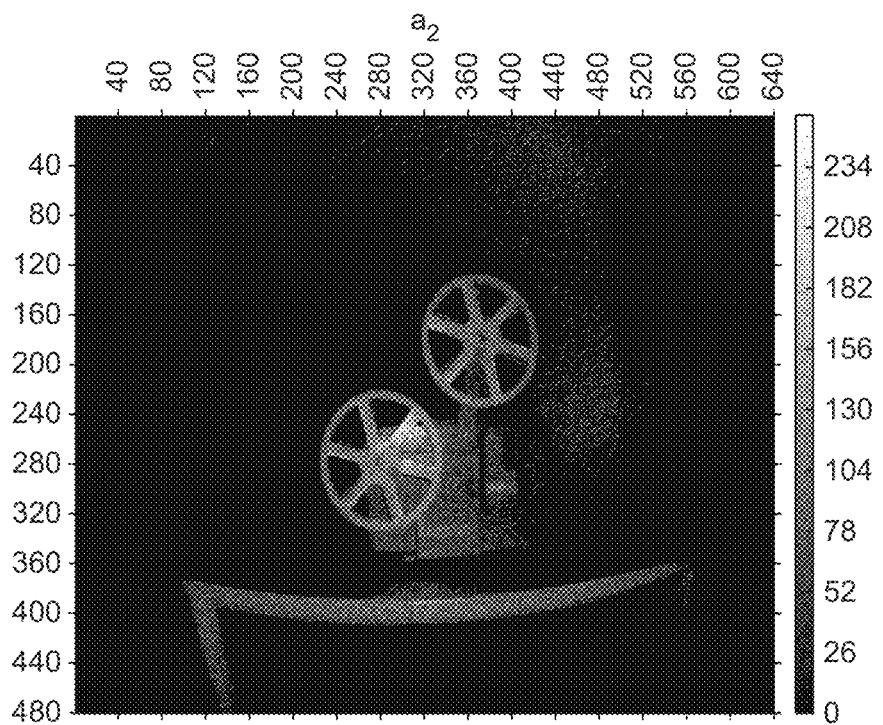
FIG. 7 is another sample image of the subject of FIG. 6 that moves and captured in respect of a second harmonic frequency signal by the imaging system of FIG. 1.
Figure 8:
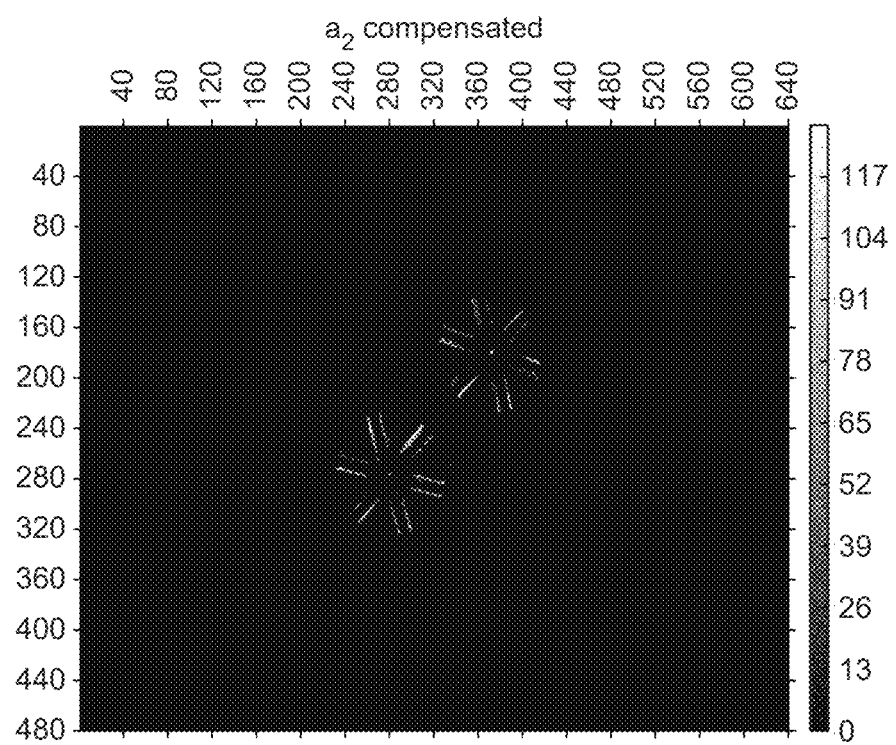
FIG. 8 is a sample compensation image generated using image data from the sample image of FIG. 6 and the sample image of FIG. 7.

Turning to FIG. 7, the amplitude map recorded is in respect of the second order, i.e. even, harmonic frequency signal generated by the DFT unit 110, which is a counterpart output signal to the fundamental frequency signal generated by the DFT unit 110 and mentioned above. Although not easily visible to the eye, the amplitude map generated (FIG. 7) using the second order harmonic signal has higher amplitudes associated with moving parts in the scene, for example edges of spokes of the reels. However, in order to remove influences on the second order harmonic frequency signal owing to the illumination light having a non-0.5 duty cycle, i.e. a pulse width asymmetric waveform, the amplitudes of the second order harmonic frequency signals respectively generated by the photonic mixer pixel devices 102 need to be compensated in the manner described above, resulting in the compensated amplitude map of FIG. 8.

Figure 9:
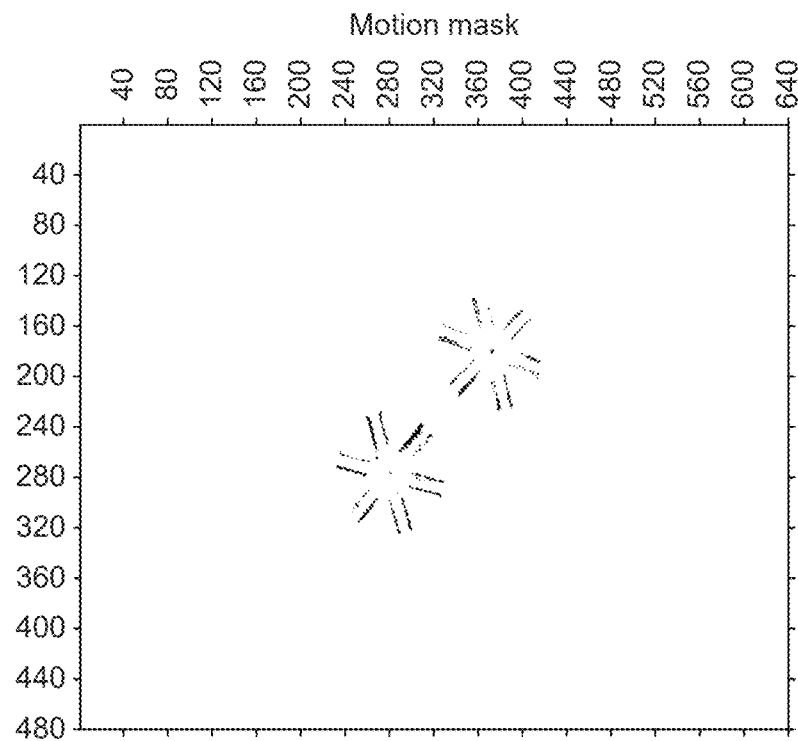
FIG. 9 is a mask generated from the sample compensation image of FIG. 8.

Referring to FIG. 9, the outputs of the first comparators 212 results in a plot that can be arranged by the signal processing circuit of the system as a detected motion mask to identify where the depth map of FIG. 6 has been affected by motion. This motion map can be used for subsequent processing in the manner described above to improve the distorted regions of the depth map of FIG. 6. In this regard, the mask can be used by the system to identify depth information that is erroneous. Subject to the policy applied by the system for handling potentially erroneous depth pixels, the system can optionally assign a low confidence rating to pixels that are determined to be affected by motion artefacts and/or remove or compensate missing or unreliable depth information, for example in the manner already mentioned above relating to illumination power and/or integration time.

Figure 10:
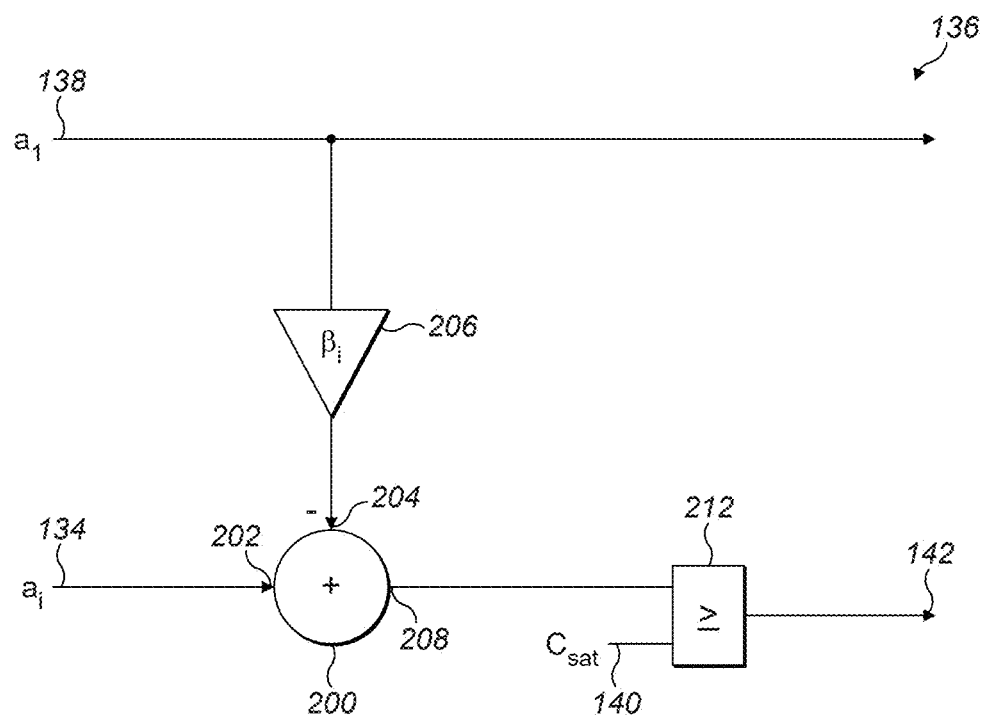
FIG. 10 is a schematic diagram of another distortion determination unit constituting another embodiment of the invention.

Referring to FIG. 10, in another embodiment, the distortion determination unit 136 is configured to identify saturation in relation to the photonic mixer pixel device 102 and so the apparatus 100 constitutes a saturation detection apparatus. In this regard, it should be appreciated that, depending upon circumstances and functionality, saturation is not considered as a phenomenon occurring solely in relation to the photonic mixer pixel device 102 or a specific component thereof and saturation can result owing to limitations of other parts of a light reception "chain" either alone or in combination with other parts of the chain, which includes the photonic mixer pixel device 102. The distortion determination unit 136 differs in this example from the previous example described in relation to FIG. 2 by the absence of the absolute value calculator 210. The distortion determination unit 136 therefore comprises the first summation unit 200 having the first input 202 coupled to the first input 134 of the distortion determination unit 136, the second, sign-inverting, input 204 of the first summation unit 200 being coupled to the output of the scaling unit 206. The input of the scaling unit 206 is coupled to the second input 138 of the distortion determination unit 136. The output 208 of the first summation unit 200 is coupled to the first input of a first comparator 212, the second input of the first comparator 212 being coupled to the third input 140 of the distortion determination unit 136. In this and further examples, the distortion threshold value is a saturation threshold value, $C_{sat}$, which can be predetermined and apply to one or more photonic mixer pixel devices, for example all photonic mixer pixel devices. The integration time and illumination power can be used, for example, to calculate the saturation threshold value, $C_{sat}$. However, the skilled person should also appreciate that other factors affect calculation of the saturation threshold value, $C_{sat}$, and hence recalculation thereof, for example dynamic range and/or decision reliability; the latter can require empirical adjustment of the saturation threshold value, $C_{sat}$. In some examples, the saturation threshold value, $C_{sat}$, can be recalculated during use of the system, for example by higher-level processing (not shown). The recalculation can become necessary in response to modification of one or more measurement parameter, for example integration time or illumination power. As mentioned above, the distortion threshold value can be stored in the digital memory (not shown) of the apparatus 100 and used when required. The output of the first comparator 212 is coupled to the distortion detection output 142 acting as a saturation detection output in this example.

Figure 11:
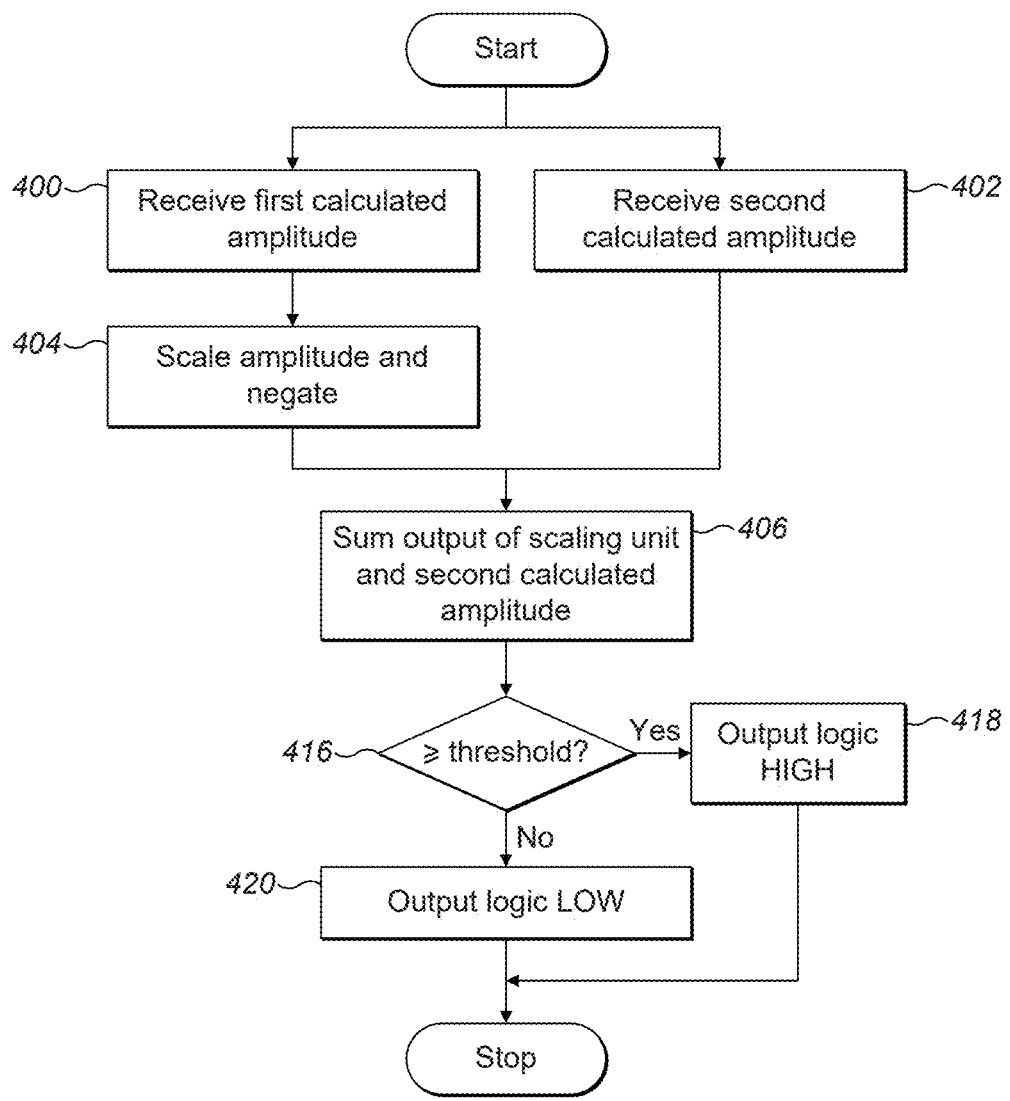
FIG. 11 is a flow diagram of a method of detecting saturation performed by the distortion determination unit detection unit of FIG. 10.

In operation (FIG. 3), the scene is illuminated, reflected light is measured on a per pixel basis by each photonic mixer pixel device 102 of the system in accordance with the indirect time of flight measurement technique and, the DFT unit 110 generates output vector components in the manner described above in relation to the previous embodiment, the vector components being in respect of the fundamental frequency and higher-order harmonic frequencies (Steps 300 to 304). As described above, the phase angles and amplitudes are calculated by the cartesian-to-polar coordinate converter 126 in respect of the fundamental frequency signal and the second amplitude calculation unit 132 calculates amplitudes in respect of higher-order harmonic frequency signals. In this example, the cartesian-to-polar coordinate converter 126 therefore calculates the first extracted (measured) calculated amplitude, $a_1$, in the complex plane from the fundamental frequency I and Q values and the second amplitude calculation unit 132 calculates the second extracted (measured) calculated amplitude, $a_2$, in the complex plane from the second harmonic frequency I and Q values (Steps 306 to 310). Referring to FIG. 11, following receipt (Steps 400 and 402) of the first and second calculated amplitudes $a_1$, $a_2$, the distortion determination unit 136 calculates (Steps 404 and 406) the compensated second amplitude, $a'_2$, formed from the subtraction of the scaled first calculated amplitude, $\beta_2 a_1$, from the second calculated amplitude, $a_2$, of the second order harmonic frequency signal. The compensated second amplitude, $a'_2$, is then compared (Step 416) with the saturation a value, $C_{sat}$, applied via the third input 140 of the distortion determination unit 136 by the first comparator 212 in order to determine whether the level of the compensated second amplitude, $a'_2$, is equal to or exceeds the saturation threshold value, $C_{sat}$. In such circumstances, where the compensated second amplitude, $a'_2$, is equal to or exceeds the saturation threshold value, $C_{sat}$, the first comparator 212 outputs (Step 418) a saturation detection signal, for example a logic HIGH, in respect of the photonic mixer pixel device 102, indicating that saturation has been detected. Otherwise, the first comparator 212 outputs (Step 420) a logic LOW, for example, as the saturation detection signal.

Figures 12A, 12B, 12C:
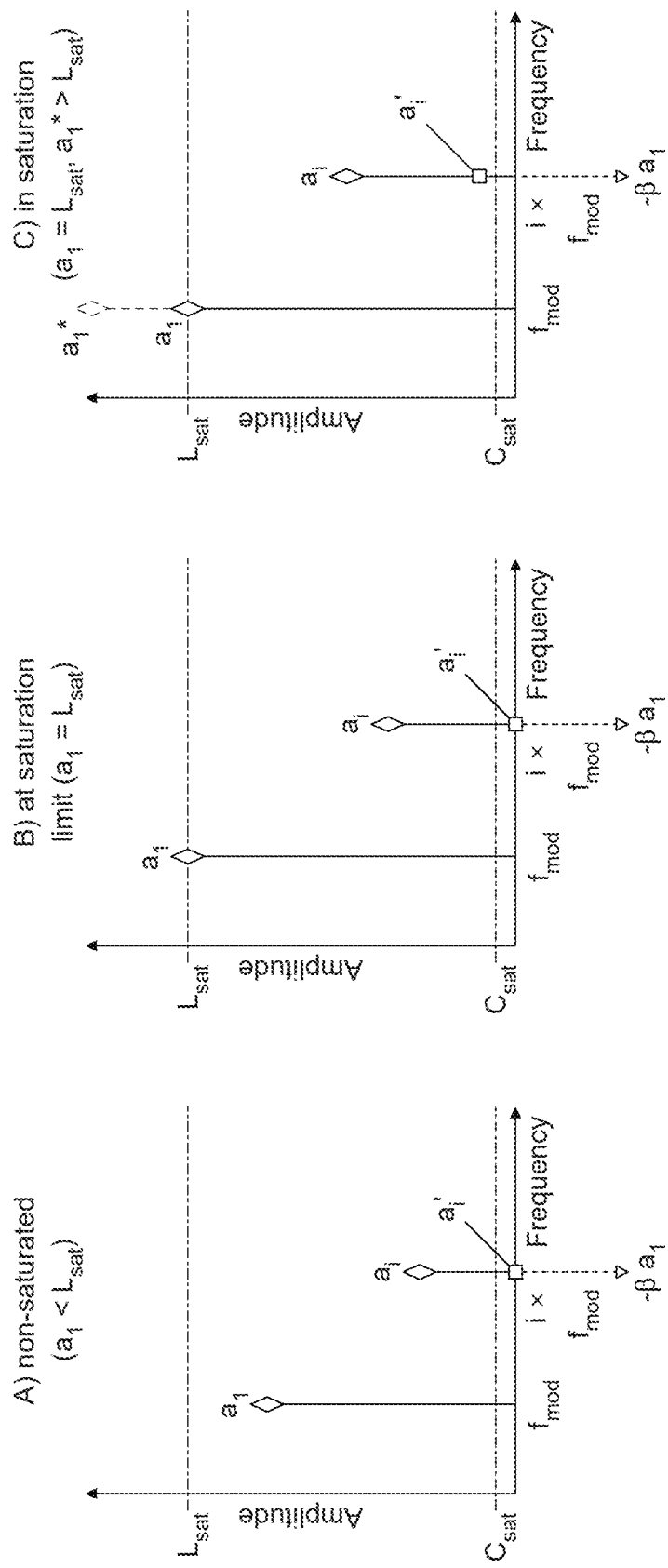
FIGS. 12(a) to (c) are graphs of use cases in relation to the method of FIG. 11.

Referring to FIG. 12(a), the illumination source using a duty cycle, D, that is not 0.5 illuminates a scene comprising an object of ordinary reflectivity, and which reflects the illumination light. The phase signal generator 112 also used the same duty cycle, D. The reflected light is received by the photonic mixer pixel device 102 and the first amplitude, $a_1$, and the second amplitude, $a_2$, are generated in respect of the fundamental frequency vector, $V_1$, and the second order harmonic vector, $V_2$, the components of which are output by the DFT unit 110 and processed by the cartesian-to-polar converter 126 and the second amplitude calculation unit 132, respectively, as described above. As the duty cycle, D, is other than 0.5, i.e. the waveform is pulse width asymmetric, the second order harmonic signal output by the DFT unit 110 is nonzero even when there is no saturation occurring with respect to the scene. Using the scaling factor previously calculated, the second amplitude, $a_2$, is returned to zero from its uncompensated value to provide a value that can be compared against a threshold value in order to detect saturation, where present. Where the photonic mixer pixel device 102 is not saturated by received reflected light from the object in the scene, i.e. the first amplitude, $a_1$, is below a saturation limit value, $L_{sat}$, of the photonic mixer pixel device 102 subtraction of the scaled first calculated amplitude, $\beta_2 a_1$, from the second calculated amplitude, $a_2$, of the second order harmonic frequency signal yields a zero value or substantially zero value irrespective of the duty cycle, D, of the continuous wave optical signal emitted by the source of electromagnetic radiation mentioned above. The saturation limit value, $L_{sat}$, can be based upon known limitations of the photonic mixer device 102 and the analogue-to-digital conversion part of the signal processing circuit less a margin to provide headroom. In this example, the photonic mixer pixel device 102 is not saturated and so the second calculated amplitude, $a_2$, remains at its nominal value. The scaled first calculated amplitude, $\beta_2 a_1$, is therefore the expected value of the second calculated amplitude, $a_2$, and so subtraction yields a zero result. This is lower than the saturation threshold value, $C_{sat}$, and so would result in a finding that no saturation has been detected.

Turning to FIG. 12(b), where reflected light received by the photonic mixer pixel device 102 is from a highly reflective object in the scene, the first calculated amplitude, $a_1$, attains the saturation limit value, $L_{sat}$, corresponding to saturation of the photonic mixer pixel device 102, i.e. the photonic mixer pixel device 102 is at saturation. The second calculated amplitude, $a_2$, is therefore at a nominal level normally associated with no saturation being detected. The compensated second amplitude, $a'_2$, formed from the subtraction of the scaled first calculated amplitude, $\beta_2 a_1$, from the second calculated amplitude, $a_2$, of the second order harmonic frequency signal is however, reduced to zero or substantially zero by the application of the compensation factor in the form of the scaled first calculated amplitude, $\beta_2 a_1$. At this level, the compensated second amplitude, $a'_2$, is below the saturation threshold value, $C_{sat}$, and so would result in a finding that the photonic mixer pixel device 102 has not become saturated yet, because the photonic mixer pixel device 102 being at saturation is within acceptable operational limits.

Referring to FIG. 12(c), when the highly reflective object in the scene causes the illumination light reflected therefrom to saturate the photonic mixer pixel device 102, the compensated second amplitude, $a'_2$, becomes nonzero and exceeds the saturation threshold value, $C_{sat}$, and so would result in a finding that the photonic mixer pixel device 102 has become saturated.

In a like manner to that described above in relation to detection of motion artefacts, the output generated by the first comparator 212 can be used by the system in order to identify one or more regions of a depth map generated by the system that are subject to saturation. As will be described later herein, where practicable, these regions can be subject to remeasuring, for example by modify one or more parameters relating to the depth measurement.

Figure 13:
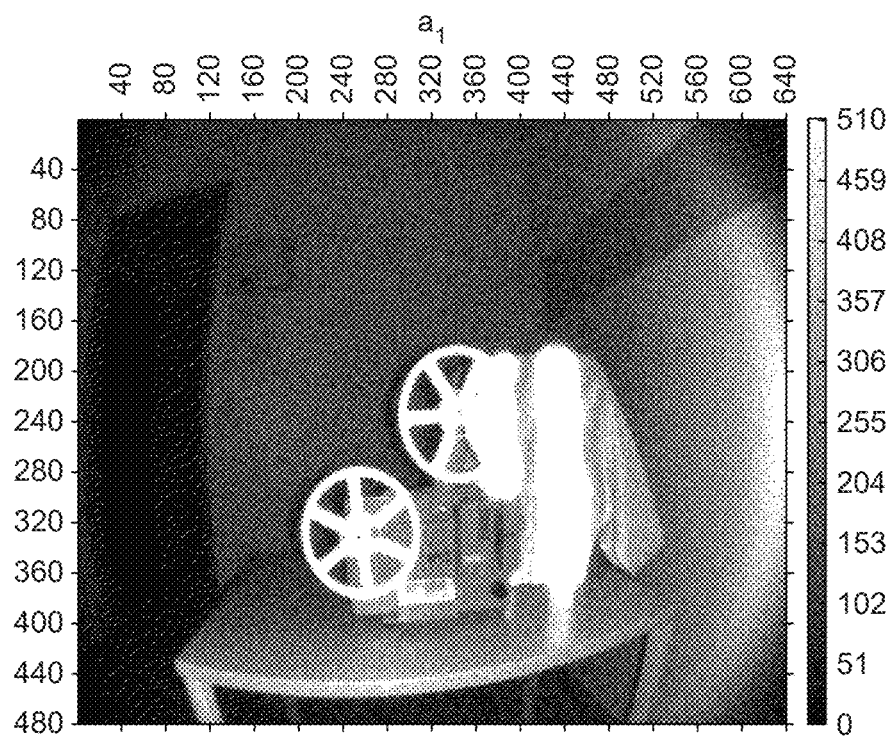
FIG. 13 is a sample image comprising a first subject that moves and a second subject that causes saturation, the sample image being captured in respect of a fundamental frequency signal by an imaging system comprising the apparatus of FIG. 10.

The effect of the above processing can be better visualised with reference to FIGS. 13 to 18. In this regard, it is assumed that the system includes the necessary functional elements to be used in conjunction with the processing elements described above in order to generate depth maps of a scene, for example a scene of a cine projector on a table having a high-visibility article of clothing, in this example a jacket, disposed behind the cine projector. As in the previous example, the cine projector has film reels that are rotating whilst the depth maps are being generated, the depth maps being generated at a predetermined frame rate, for example 50 frames-per-second. Referring to FIG. 13, the amplitude map recorded in respect of the fundamental frequency signal generated by the DFT unit 110 is captured at an arbitrary point in time when the reels are moving. Although not visible, the amplitude map comprises information that can be used to support identification of motion artefacts, in the depth map (not shown). In this example, such information can be used to enable motion artefacts associated with motion of the reels to be detected, which were of course moving at the time the depth map was generated. However, some pixels particularly those in respect of the high-visibility jacket are saturated. As such, measurements of depth/range by the photonic mixer pixel devices 102 receiving reflected light from the rotating reels and the high-visibility jacket are affected by the motion of the reels and the high reflectivity of the jacket respectively, resulting in a degree of distortion in respect of the reels and the jacket.

Figure 14:
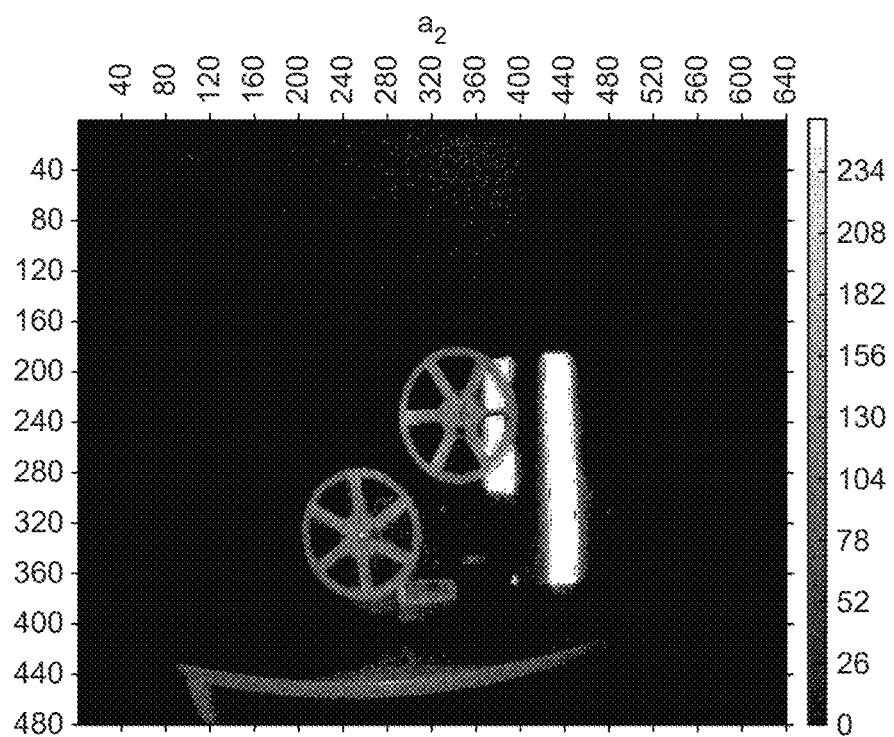
FIG. 14 is a sample image of the subjects of FIG. 13 that move and saturate and captured in respect of a second harmonic frequency signal by the imaging system comprising the apparatus of FIG. 10.
Figure 15:
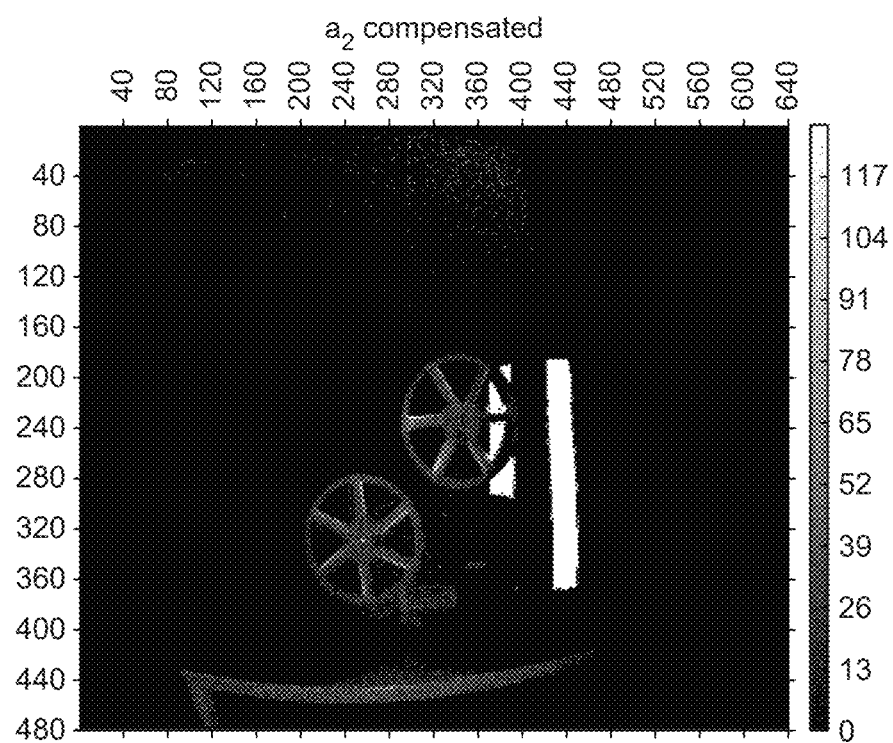
FIG. 15 is a sample compensation image generated using image data from the sample image of FIG. 13 and the sample image of FIG. 14.
Figure 16:
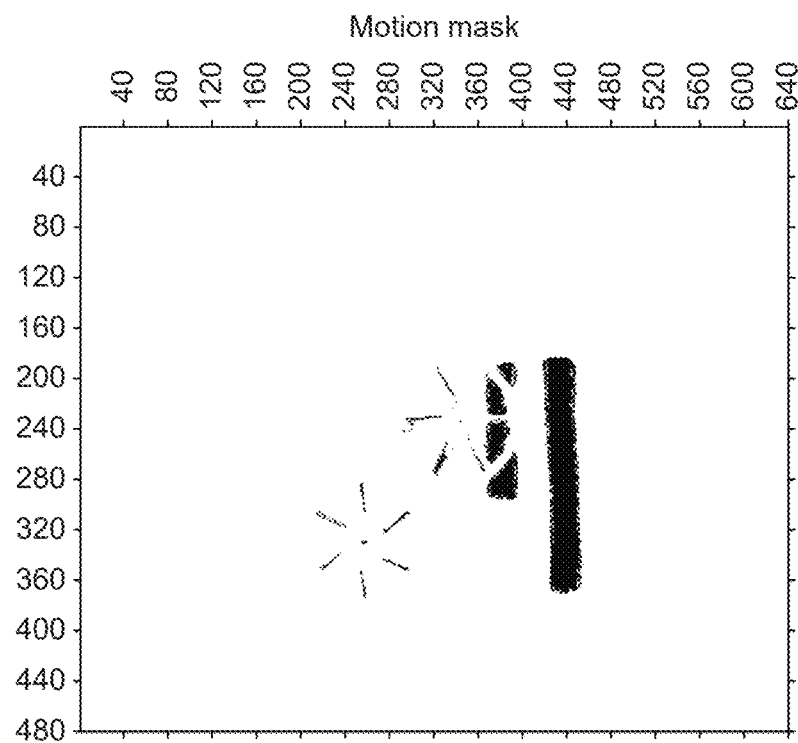
FIG. 16 is a motion mask generated from the sample compensation image of FIG. 15.
Figure 17:
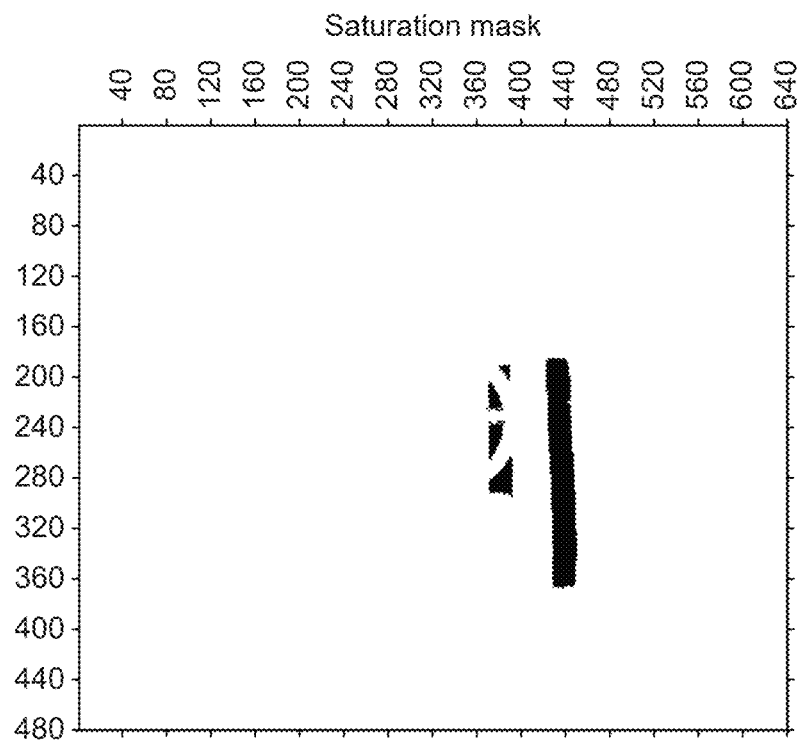
FIG. 17 is a saturation mask generated from the motion mask of FIG. 16.

Turning to FIG. 14, the amplitude map recorded is in respect of a higher order, for example second, harmonic frequency signal generated by the DFT unit 110, which is a counterpart output signal to the fundamental frequency signal generated by the DFT unit 110 and mentioned above. Although not easily visible to the eye, the amplitude map generated (FIG. 14) using the second order harmonic frequency signal has higher or lower than normal expected levels of amplitudes associated with moving objects and highly reflective objects in the scene, for example edges of spokes of the reels and the high-visibility jacket. However, in order to remove influences on the second order harmonic frequency signal owing to the illumination light having a non-0.5 duty cycle, i.e. a pulse width asymmetric waveform, the amplitudes of the second order harmonic signals respectively generated by the photonic mixer pixel devices 102 need to be compensated in the manner described above, resulting in the amplitude map of FIG. 15. As can be seen, regions of the compensated amplitude map relating to motion or reflection have greater amplitudes. Indeed, the motion detection threshold, $C_m$, in conjunction with the first comparator 212 can be used to generate a motion detection mask (FIG. 16). In FIG. 16, saturation is erroneously detected as motion in the scene. However, where motion detection is required, but no correction is to be made for the motion, this erroneous detection of regions of saturation as motion artefacts is not problematic. Furthermore, a saturation mask, using the saturation threshold, $C_{sat}$, and the output of the first comparator 212 can also be generated (FIG. 17) by the signal processing circuit of the system.

Figure 18:
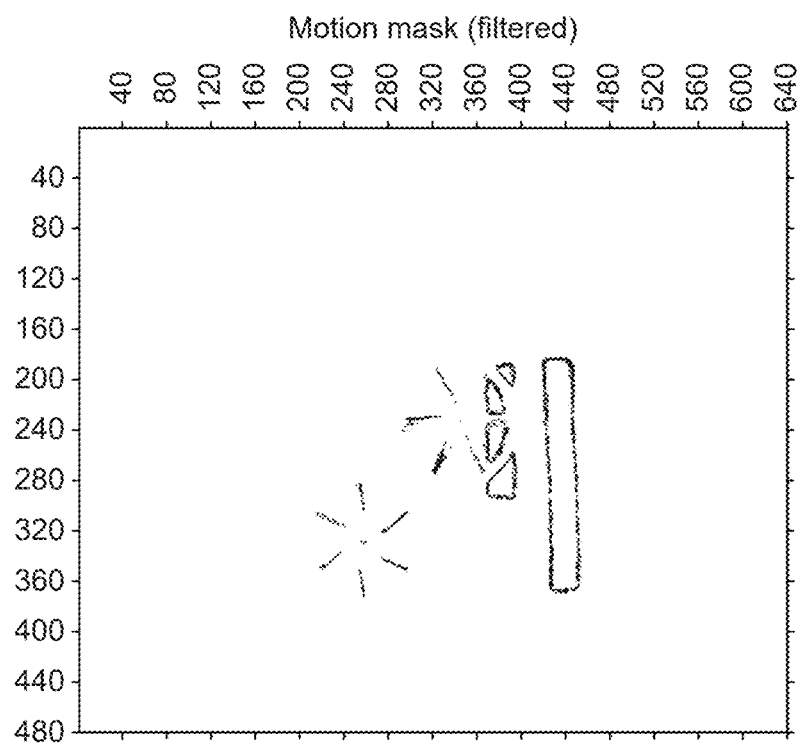
FIG. 18 is a further motion mask generated from the saturation mask of FIG. 17.

Referring to FIG. 18, since the threshold for saturation detection is greater than the threshold for motion detection, i.e. $C_{sat} > C_m$, it is possible to distinguish between regions of saturation and regions of motion in the motion detection mask of FIG. 16. In this regard, using the saturation mask (FIG. 17), the motion mask (FIG. 16) can be filtered, for example corrected, in order to exclude the regions of saturation from the motion mask. One example filtering technique employs a Boolean combination of the motion mask described herein and the saturation mask described herein, such as: motion_mask AND (NOT saturation_mask), which can be applied to a depth map. This motion mask and/or the saturation mask can be used for subsequent processing in the manner described above to improve the distorted regions of the depth map of FIG. 13. In this regard, the mask can be used by the system to identify depth information that is erroneous. Subject to the policy applied by the system for handling potentially erroneous depth pixels, the system can optionally assign a low confidence rating to pixels that are determined to be affected by saturation and/or remove or compensate missing or unreliable depth information, for example in the manner already mentioned above relating to illumination power and/or integration time.

The above steps (Steps 300 to 314, 400 to 406 and 416 to 420) are repeated (Step 316) until generation of depth maps is no longer required.

In the above embodiment, the technique for saturation detection is similar to the technique for motion detection in that compensation is applied to a higher-order harmonic frequency signal that is analysed with reference to a fixed threshold value. During normal operation, the saturation detection threshold, $C_{sat}$, is selected so as to be higher than the motion detection threshold, $C_m$, and so saturation is erroneously detected as motion without the use of additional filtering/correction as noted above. However, in a further embodiment motion artefacts can be distinguished from saturation by comparing a compensated amplitude, $a_i'$, of a higher-order harmonic frequency signal with an available headroom of the amplitude of the fundamental frequency signal, $a_1$, with respect to the saturation limit value, $L_{sat}$, of the photonic mixer pixel device 102. The headroom can be calculated by subtracting the amplitude of the fundamental frequency signal, $a_1$, from the saturation limit, $L_{sat}$.

Figure 19:
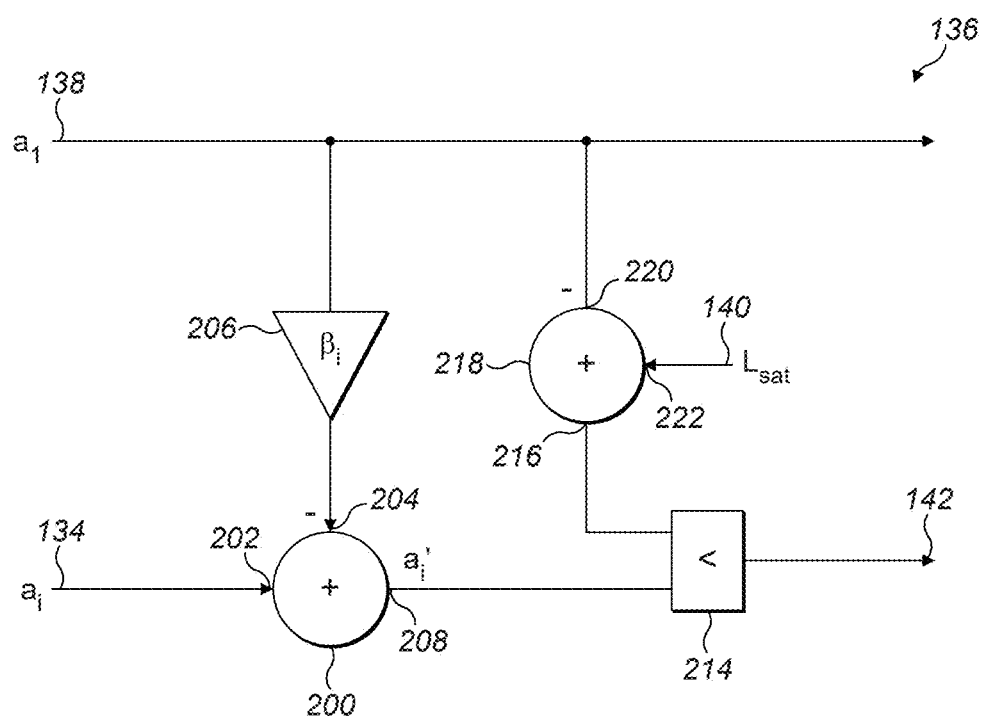
FIG. 19 is a schematic diagram of another saturation detection unit constituting the distortion determination apparatus of FIG. 1.

Referring to FIG. 19, the distortion determination unit 136 is configured to identify saturation of the photonic mixer pixel device 102 in accordance with the saturation headroom technique outlined above. The distortion determination unit 136 differs in this example from the previous example described in relation to FIG. 10 in the following manner. The distortion determination unit 136 comprises the first summation unit 200 having the first input 202 coupled to the first input 134 of the distortion determination unit 136, the second, sign-inverting, input 204 of the first summation unit 200 being coupled to the output of the scaling unit 206. The input of the scaling unit 206 is coupled to the second input 138 of the distortion determination unit 136. The output 208 of the first summation unit 200 is coupled to a first input of a second comparator 214, the first comparator 212 no longer being employed. A second input of the second comparator 214 is coupled to an output 216 of a second summation unit 218, a first, sign-inverting, input 220 of the second summation unit 218 being coupled to the second input 138 of the distortion detection unit 136. A second input 222 of the second summation unit 218 is coupled to the third input 140 of the distortion determination unit 136, which in this example provides the saturation limit value, $L_{sat}$, which can be stored in the digital memory mentioned above. An output of the second comparator 214 is coupled to the distortion detection output 142 of the distortion determination unit 136, which in this example serves as a saturation detection output.

Figure 20:
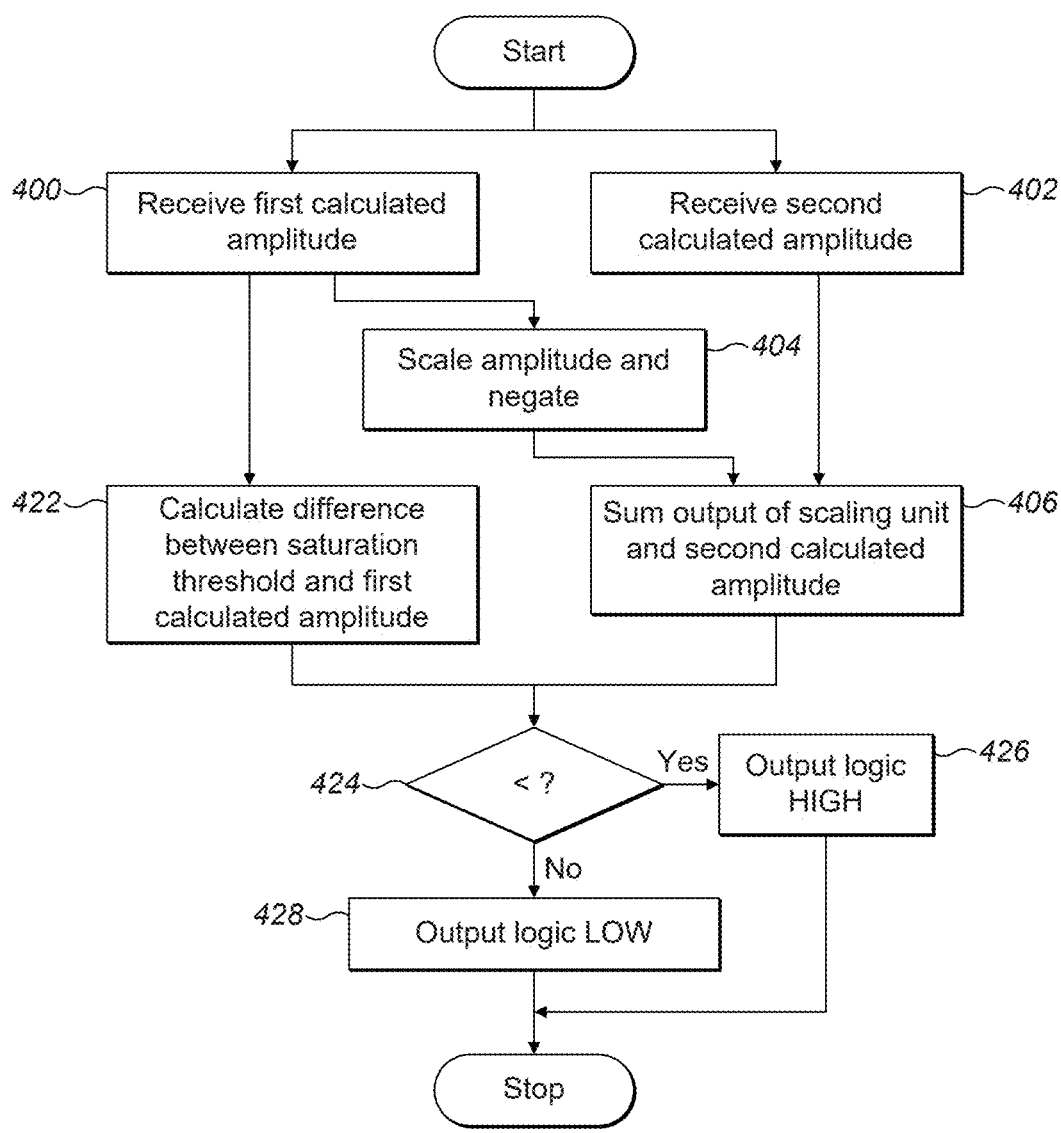
FIG. 20 is a flow diagram of a further method of detecting saturation constituting yet another embodiment of the invention.

In operation (FIG. 3), the scene is illuminated, reflected light is measured on a per pixel basis by each photonic mixer pixel device 102 of the system in accordance with the indirect time of flight measurement technique and, the DFT unit 110 generates components of output vectors in the manner described above in relation to the previous embodiment, the vectors being in respect of the fundamental frequency and higher-order harmonic frequencies (Steps 300 to 304). As described above, the phase angles and amplitudes are calculated by the cartesian-to-polar coordinate converter 126 in respect of the fundamental frequency signal and the second amplitude calculation unit 132 calculates amplitudes in respect of higher-order harmonic frequency signals. In this example, the cartesian-to-polar coordinate converter 126 therefore calculates the first extracted (measured) calculated amplitude, $a_1$, in the complex plane from the fundamental frequency I and Q values and the second amplitude calculation unit 132 calculates the second extracted (measured) calculated amplitude, $a_2$, in the complex plane from the second harmonic frequency I and Q values (Steps 306 to 310). Referring to FIG. 20, following receipt (Steps 400 and 402) of the first and second calculated amplitudes $a_1$, $a_2$, the distortion determination unit 136 calculates (Steps 404 and 406) the compensated second amplitude, $a_2'$, formed from the subtraction of the scaled first calculated amplitude, $\beta_2 a_1$, from the second calculated amplitude, $a_2$, of the second order harmonic frequency signal. Substantially simultaneously, the first calculated amplitude, $a_1$, is applied to the first, sign-inverting, input 220 of the second summation unit 218 and the saturation limit value, $L_{sat}$, is applied to the second input 222 of the second summation unit 218. In response to these inputs, the second summation unit 218 generates (Step 422) an output value that is the difference between the saturation limit value, $L_{sat}$, and the first calculated amplitude, $a_1$, i.e. $L_{sat} - a_1$, constituting a saturation threshold value. The compensated second amplitude, $a'_2$, is then compared (Step 424) with the saturation threshold value, $L_{sat} - a_1$, by the second comparator 214 in order to determine whether the level of the compensated second amplitude, $a_2'$, is less than the saturation threshold value, $L_{sat} - a_1$. When the compensated second amplitude, $a_2'$, is equal to or greater than the saturation threshold value, $L_{sat} - a_1$, the second comparator 214 outputs (Step 426) the saturation detection signal, for example a logic HIGH, in respect of the photonic mixer pixel device 102, indicating that saturation has been detected. Otherwise, the second comparator 214 outputs (Step 428) a logic LOW, for example, as the saturation detection signal.

The above steps (Steps 300 to 314, 400 to 406 and 424 to 428) are repeated (Step 316) until generation of depth maps is no longer required.

Figure 21:
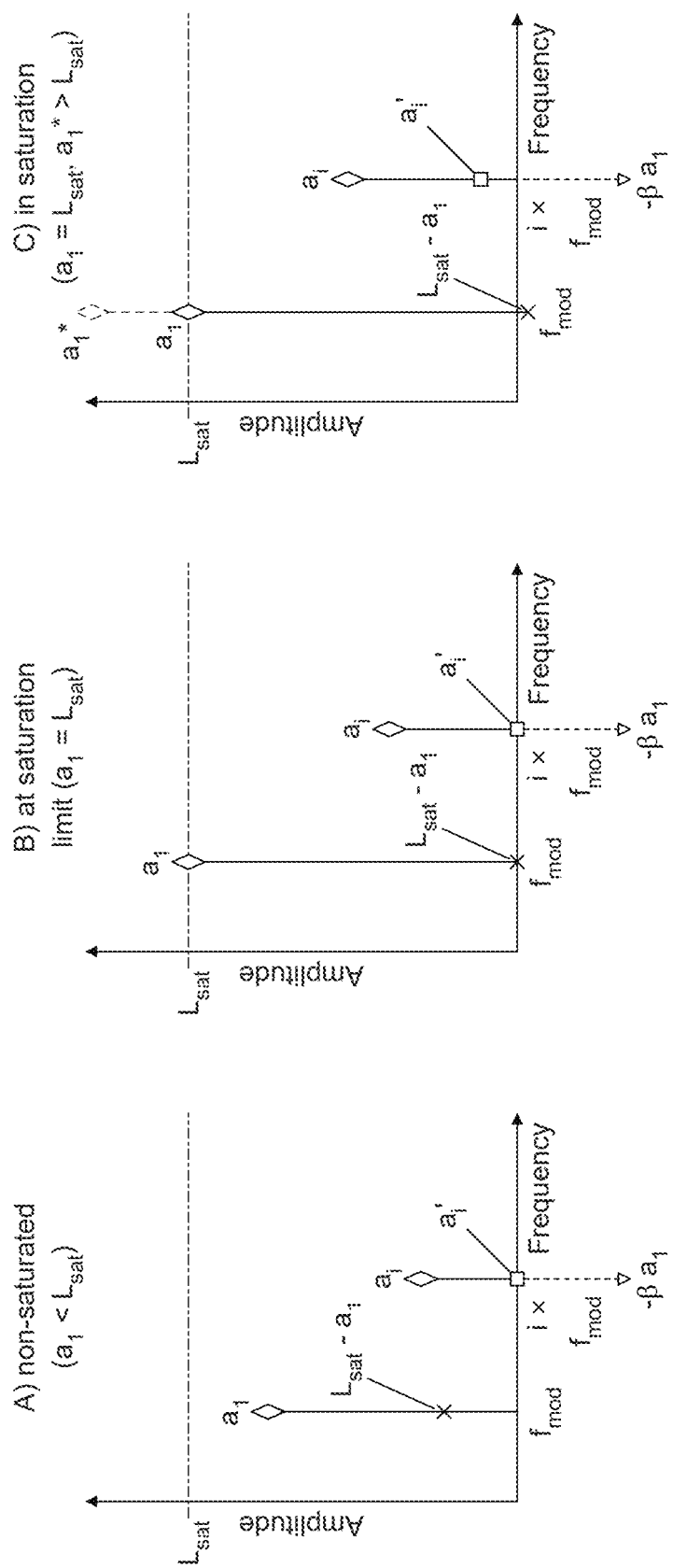
FIGS. 21(a) to (c) are graphs of use cases in relation to the method of FIG. 20.

Referring to FIG. 21(a), the illumination source using a duty cycle, D, that is not 0.5 illuminates the scene comprising the object of ordinary reflectivity mentioned above in relation to the previous embodiment, and which reflects the illumination light. The phase signal generator 112 also used the same duty cycle, D. The reflected light is received by the photonic mixer pixel device 102 and the DFT unit 110 outputs components of the fundamental frequency vector, $V_1$, and the second order harmonic vector, $V_2$. The cartesian-to-polar converter 126 and the second amplitude calculation unit 132 calculate the first amplitude, $a_1$, and the second amplitude, $a_2$, as described above. As the duty cycle, D, is other than 0.5, i.e. the waveform of the continuous wave optical signal is pulse width asymmetric, the second order harmonic frequency signal output by the DFT unit 110 is nonzero even when there is no saturation occurring with respect to the scene. Using the scaling factor previously calculated, the second amplitude, $a_2$, is returned to zero from its uncompensated value to provide a value that can be compared against the calculated saturation threshold value, $L_{sat}-a_1$, in order to detect saturation, where present. Thus, when the photonic mixer pixel device 102 is not saturated by received reflected light from the object in the scene, subtraction of the scaled first calculated amplitude, $\beta_2 a_1$, from the second calculated amplitude, $a_2$, of the second order harmonic frequency signal yields a zero value or substantially zero value irrespective of the duty cycle, D, of the continuous wave optical signal emitted by the source of electromagnetic radiation mentioned above. In this example, the photonic mixer pixel device 102 is not saturated and so the second calculated amplitude, $a_2$, remains at its nominal value. The scaled first calculated amplitude, $\beta_2 a_1$, is therefore the expected value of the second calculated amplitude, $a_2$, and so subtraction yields a zero or near-zero result. The compensated second amplitude, $a'_2$, is therefore less than the saturation threshold value, $L_{sat}-a_1$, and so would result in an output at the saturation detection output 142 indicative of no saturation having been detected. It should be appreciated that this manner of saturation detection is advantageous over the previously described saturation detection technique in that the detection threshold can be set higher for non-saturated images as opposed to saturated images. As such, the higher saturation threshold reduces the possibility of compensated amplitudes attributable to motion being incorrectly detected as saturation.

Turning to FIG. 21(b), where reflected light received by the photonic mixer pixel device 102 is from a highly reflective object in the scene, the first calculated amplitude, $a_1$, attains a level, $L_{sat}$, corresponding to saturation of the photonic mixer pixel device 102, i.e. the photonic mixer pixel device 102 is at saturation. The second calculated amplitude, $a_2$, is therefore at a nominal level normally associated with no saturation being detected. The compensated second amplitude, $a_2'$, formed from the subtraction of the scaled first calculated amplitude, $\beta_2 a_1$, from the second calculated amplitude, $a_2$, of the second order harmonic frequency signal is however, reduced to zero or substantially zero by the application of the compensation factor in the form of the scaled first calculated amplitude, $\beta_2 a_1$. At this level, the compensated second amplitude, $a_2'$, is equal to the saturation threshold value, $L_{sat}-a_1$, and so would result in an output at the saturation detection output 142 indicative of the photonic mixer pixel device 102 having become saturated or is at saturation.

Referring now to FIG. 21(c), when the highly reflective object in the scene causes the illumination light reflected therefrom to saturate the photonic mixer pixel device 102, the compensated second amplitude, $a_2'$, becomes nonzero and exceeds the saturation threshold value, $L_{sat}-a_1$, and so would result in an output at the saturation detection output 142 indicative of the photonic mixer pixel device 102 having become saturated. Owing to the dynamic nature of the saturation threshold value, $L_{sat}-a_1$, in such circumstances the saturation threshold value, $L_{sat}-a_1$, becomes zero or slightly less than zero and thus below a motion detection threshold, $C_m$. This therefore provides better detection, i.e. selectivity, of saturated pixels over pixels affected by motion than the previously described saturation detection technique.

In another embodiment, the photonic mixer pixel device 102 is treated as if it is not constrained by the saturation limit value, $L_{sat}$. The compensation factor is employed in order to model an amplitude, $a_1^*$, in respect of the fundamental frequency for reflected light received by the photonic mixer pixel device 102 when unconstrained by the saturation limit value, $L_{sat}$. This is effectively an estimate of a true received light intensity in respect of the photonic mixer pixel device 102. The amplitude calculated is calculated by the distortion determination unit 136 and is, in effect, a virtual amplitude, because in practice the photonic mixer pixel device 102 does eventually saturate and so possess a saturation limit. The distortion calculation unit 136 also calculates a difference between the virtual amplitude, $a_1^*$, and the saturation limit value, $L_{sat}$, of the photonic mixer pixel device 102. This difference is the excess amplitude, i.e. the amount of amplitude that the virtual amplitude, $a_1^*$, is in excess of the saturation limit value, $L_{sat}$. The excess amplitude, $a_1^*-L_{sat}$, can be compared against the amplitude, $a_i'$, of the compensated higher-order harmonic frequency signal in order to detect saturation of the photonic mixer pixel device 102, but as will become apparent from the explanation below, it can suffice to compare the excess amplitude, $a_1^*-L_{sat}$, with a threshold value, for example the saturation threshold, $C_{sat}$, set to a value specific to this example.

Figure 22:
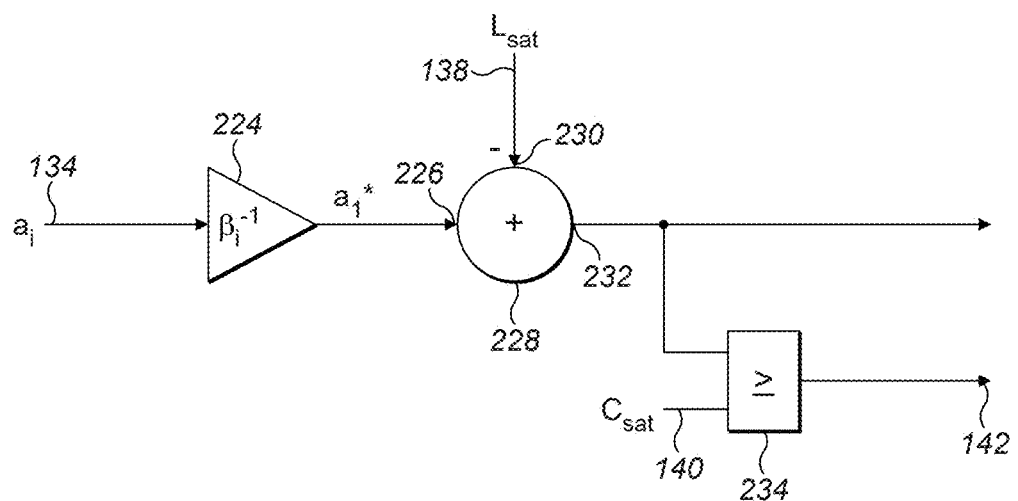
FIG. 22 is a schematic diagram of a further saturation detection unit constituting the distortion determination apparatus of FIG. 1.

The inverse or reciprocal of the scaling factor, $\beta_i$, can be applied to the amplitude, $a_i$, of a higher-order harmonic frequency signal generated by the DFT unit 110 in order to model, for example project, the unconstrained value of the amplitude, $a_1^*$, of the fundamental frequency signal, referred to above as the virtual amplitude. Referring to FIG. 22, the distortion calculation unit 136 is configured slightly differently in that the distortion calculation unit 136 no longer requires the first calculated amplitude, $a_1$, from the cartesian-to-polar converter 126. Instead, the second input 138 of the distortion calculation unit 136 is now used to provide the saturation limit value, $L_{sat}$, stored in the digital memory as described above in relation to the previous example. The first input 134 of the distortion calculation unit 136 is coupled to an input of a second scaling unit 224 configured to apply the reciprocal of the scaling factor, $\beta_i$, i.e. $\beta_i^{-1}$. An output of the second scaling unit 224 is coupled to a first input 226 of a third summation unit 228 and a second, sign-inverting, input 230 of the third summation unit 228 is coupled to the second input 138 of the distortion calculation unit 136. An output 232 of the third summation unit 228 is coupled to a first input of a third comparator 234. A second input of the third comparator 234 is coupled to the third input 140 of the distortion calculation unit 136 from which the saturation threshold, $C_{sat}$, mentioned above is provided. An output of the third comparator 234 is coupled to the saturation detection output 142 of the distortion calculation unit 136.

Figure 23:
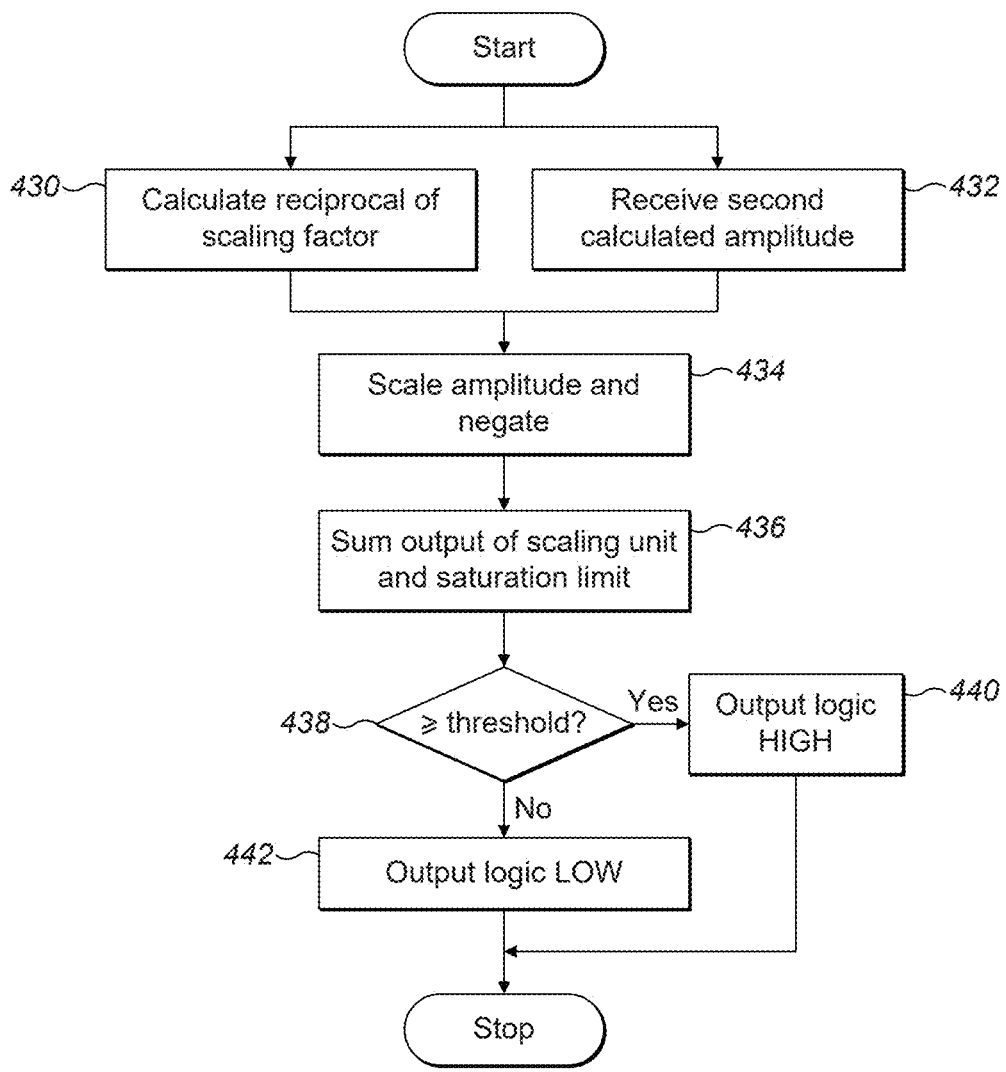
FIG. 23 is a flow diagram of yet a further method of detecting saturation constituting yet a further embodiment of the invention.

In operation (FIG. 3), the scene is illuminated and reflected light is measured on a per pixel basis by each photonic mixer pixel device 102 of the system in accordance with the indirect time of flight measurement technique. The DFT unit 110 generates output vectors in the manner described above in relation to the previous embodiment, the vectors being in respect of the fundamental frequency and higher-order harmonic frequencies (Steps 300 to 304). As described above, the phase angles and amplitudes are calculated by the cartesian-to-polar coordinate converter 126 in respect of the fundamental frequency signal, and the second amplitude calculation unit 132 calculates amplitudes in respect of higher-order harmonic frequency signals. In this example, the cartesian-to-polar coordinate converter 126 therefore calculates the first extracted (measured) calculated amplitude, $a_1$, in the complex plane from the fundamental frequency I and Q values and the second amplitude calculation unit 132 calculates the second extracted (measured) calculated amplitude, $a_2$, in the complex plane from the second harmonic frequency I and Q values (Steps 306 to 310), although the first calculated amplitude, $a_1$, is not used in this example for the determination of saturation, but it can be used for other purposes, for example as a confidence indicator for selecting pixels for further processing. Referring to FIG. 23, the distortion determination unit 136 calculates (Step 430) a reciprocal of the scaling factor, $\beta_i^{-1}$, and following receipt (Step 432) of the second calculated amplitude, $a_2$, the distortion determination unit 136 calculates (Steps 434) the virtual amplitude, $a_1^*$, formed by the second scaling unit 224 scaling the second calculated amplitude, $a_2$, by the reciprocal of the scaling factor, $\beta_i^{-1}$. The excess amplitude is then calculated (Step 436) by the third summation unit 228 subtracting the saturation limit, $L_{sat}$, from virtual amplitude, $a_1^*$. The excess amplitude, $L_{sat}-a_1^*$, is then compared (Step 438) with the saturation threshold, $C_{sat}$, by the third comparator 134 to determine if the excess amplitude, $L_{sat}-a_1^*$, is greater than or equal to the saturation threshold, $C_{sat}$. When the excess amplitude, $L_{sat}-a_1^*$, is equal to or greater than the saturation threshold value, $C_{sat}$, the third comparator 234 outputs (Step 440) the saturation detection signal, for example a logic HIGH, in respect of the photonic mixer pixel device 102, indicating that saturation has been detected. Otherwise, the third comparator 234 outputs (Step 442) a logic LOW, for example, as the saturation detection signal.

Figures 24A, 24B, 24C:
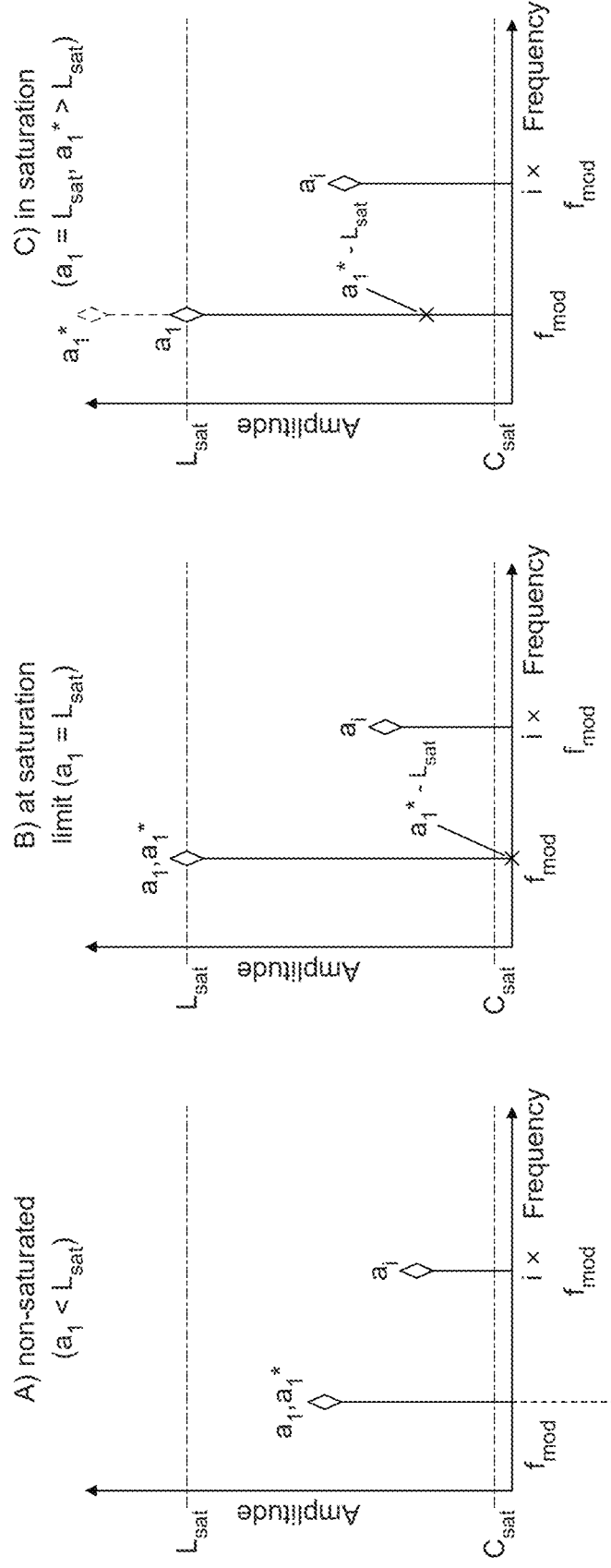
FIGS. 24(a) to (c) are graphs of use cases in relation to the method of FIG. 23.

Referring to FIG. 24(*a*), the illumination source using a duty cycle, D, that is not 0.5 illuminates the scene comprising the object of ordinary reflectivity mentioned above, and which reflects the illumination light. The phase signal generator 112 also used the same duty cycle, D. The reflected light is received by the photonic mixer pixel device 102 and the DFT unit 110 generates components of the fundamental frequency vector, $V_1$, and the second order harmonic vector, $V_2$, respectively. The cartesian-to-polar converter 126 and the second amplitude calculation unit 132 calculates the first amplitude, $a_1$, and the second amplitude, $a_2$, based upon the components of the fundamental frequency vector, $V_1$, and the second order harmonic vector, $V_2$, as described above. As the duty cycle, D, is other than 0.5, i.e. the waveform of the continuous wave optical signal is pulse width asymmetric, the second calculated amplitude, $a_2$, of second order harmonic signal output by the DFT unit 110, as well as other higher-order harmonics, is nonzero even when there is no saturation caused by the scene with respect to the photonic mixer pixel device 102. The excess amplitude, $L_{sat}-a_1^*$, calculated from the second calculated amplitude, $a_2$, is used as a measure of saturation that can be compared against the calculated threshold value, $C_{sat}$, in order to detect saturation, where present. When the photonic mixer pixel device 102 is not saturated by received reflected light from the object in the scene, the excess amplitude, $L_{sat}-a_1^*$, is a negative value irrespective of the duty cycle, D, of the continuous wave optical signal emitted by the source of electromagnetic radiation mentioned above. In this example, the photonic mixer pixel device 102 is not saturated and so the excess amplitude excess amplitude, $L_{sat}-a_1^*$, is negative. As the excess amplitude excess amplitude, $L_{sat}-a_1^*$, is less than the saturation threshold value, $C_{sat}$, (not shown in FIG. 24(*a*)), the output at the saturation detection output 142 is indicative of no saturation having been detected.

Turning to FIG. 24(*b*), where reflected light received by the photonic mixer pixel device 102 is from a highly reflective object in the scene, the first calculated amplitude, $a_1$, attains a level, $L_{sat}$, corresponding to the photonic mixer pixel device 102 being at saturation. The second calculated amplitude, $a_2$, is therefore at a nominal level normally associated with no saturation being detected. The excess amplitude, $L_{sat}-a_1^*$, calculated is however, zero or substantially zero. At this level, the excess amplitude, $L_{sat}-a_1^*$, is equal to the saturation threshold value, $C_{sat}$, and the output at the saturation detection output 142 is indicative of the photonic mixer pixel device 102 having become saturated or being at saturation.

Referring now to FIG. 24(*c*), when the highly reflective object in the scene causes the illumination light reflected therefrom to saturate the photonic mixer pixel device 102, the excess amplitude, $L_{sat}-a_1^*$, becomes nonzero and positive and so exceeds the saturation threshold value, $C_{sat}$, and so the output at the saturation detection output 142 becomes indicative of the photonic mixer pixel device 102 having become saturated.

In another embodiment, the system is an imaging system and comprises a statistical processing engine that uses the excess amplitude, $L_{sat}-a_1^*$, as an input therefor in order to identify saturated pixels or areas of saturation at an image level. In this regard, the excess amplitude, $L_{sat}-a_1^*$, can be used to modify, for example reduce, one or more configuration/setup parameters, for example integration time and/or illumination power, prior to measuring the scene for a second time. The second measurement is thus expected not to be subject to saturation or subject to less saturation than the first measurement. In one example, the statistical processing engine analyses a depth map generated in respect of a first frame cycle and determines a maximum excess amplitude and then uses the maximum excess amplitude as a basis for modifying one or more measurement parameter, for example the integration time and/or illumination power mentioned above, in respect of a second subsequent frame cycle. In another example, saturated regions of a first depth map image can be replaced by non-saturated corresponding regions of a second depth map image acquired over a second frame cycle following, for example immediately following, the first frame cycle. Furthermore, for some applications, the statistical processing can comprise filtering and/or algorithmic processing in order to ignore small clusters of saturated pixels and/or lines of saturation and avoid applying compensation for these pixels, because the performance of the application, for example image recognition, is unaffected by the saturation of such small numbers of pixels.

Figure 25:
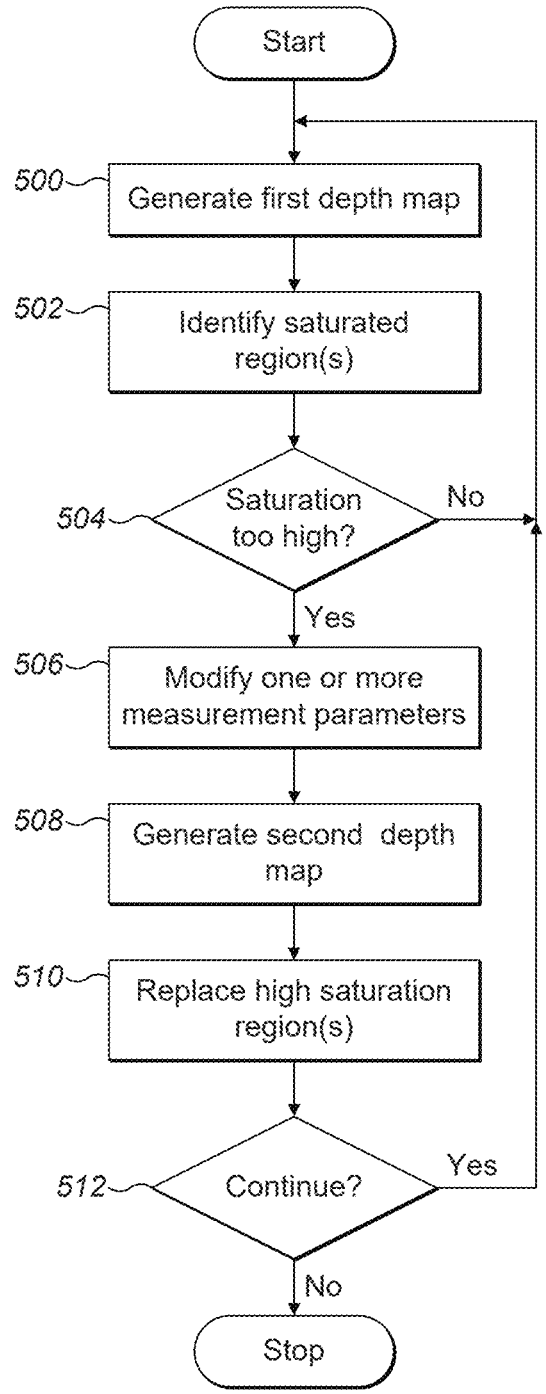
FIG. 25 is a flow diagram of a method of generating a depth map using the method of FIG. 23.

Referring to FIG. 25, the system generates (Step 500) a first depth map, constituting a first image capture, over a first frame cycle and uses the technique described above to calculate the excess amplitude, $L_{sat}-a_1^*$, in respect of each or substantially each photonic mixer pixel device 102 of the system. The system then statistically evaluates (Step 502) the first depth map in order to identify regions of the first depth map where the excess amplitude, $L_{sat}-a_1^*$, exceeds zero. The statistical analysis can comprise tallying amplitudes of pixels up to the saturation limit value, $L_{sat}$, and tallying excess amplitudes, $L_{sat}-a_1^*$, of pixels beyond the saturation limit value, $L_{sat}$, and analysing the collected data to identify the greatest number of pixels generating amplitudes above the saturation limit value, $L_{sat}$. The excess amplitude, $L_{sat}-a_1^*$, having the highest tally can be used as a measure of the most common excess amplitude value above the saturation limit value, $L_{sat}$. The difference between the most common excess amplitude, $L_{sat}-a_1^*$, and the saturation limit value, $L_{sat}$, can be used as a measure of degree of saturation and used to modify integration time, illumination intensity or a combination thereof by, for example, the proportion of saturation limit value, $L_{sat}$, that the difference between amplitudes calculated represents. In another example, the amplitudes of the pixels and the excess amplitudes can be aggregated by binning. In this regard, the statistical processing engine can analyse the tally data generated in order to identify an excess amplitude, $L_{sat}-a_1^*$, as an acceptable saturation threshold for determining (Step 504) whether a given calculated excess amplitude, $L_{sat}-a_1^*$, is equal to or below the acceptable saturation threshold. In one example, the amplitude bin having the highest tally can be used as the acceptable saturation threshold. In another example, a minimum tally value can be predetermined and used to identify an amplitude bin having a highest tally above the minimum tally value, the identified amplitude bin being used as the acceptable saturation threshold, for example a midpoint thereof.

If the saturation threshold is not exceeded, then the level of saturation is deemed acceptable and the above process is repeated (Steps 500 to 504) and further depth maps are generated using the same measurement parameters. However, if the saturation threshold is exceeded, one or more measurement parameter, for example the integration time and/or the power of the source of electromagnetic radiation mentioned above is/are modified (Step 506) in order to try to reduce saturation and another depth map is generated (Step 508) over a second frame cycle immediately following the first frame cycle using the adapted measurement parameter(s). The regions of the first depth map identified where the excess amplitude, $L_{sat}-a_1''$, is greater than zero are then identified in the counterpart second depth map and the measurements associated with the regions of the first depth map where the excess amplitude, $L_{sat}-a_1^*$, has been identified as being greater than zero are replaced (Step 510) by the corresponding same regions of the second depth map. The resulting corrected depth map is then output for further processing. The above process is repeated (Step 500 to 512) until depth map generation is no longer required.

Although, in the above example, the excess amplitude, $L_{sat}-a_1^*$, is employed as a measure of amplitude excess, the virtual amplitude, $a_1^*$, can be employed instead of the excess amplitude, $L_{sat}-a_1^*$, and the saturation threshold value, $C_{sat}$, can be increased accordingly to compensate for the direct use of the virtual amplitude, $a_1^*$, as opposed to the excess amplitude, $L_{sat}-a_1^*$.

In another example, the distortion determination unit 136 of FIG. 22 is modified so that instead of providing of the saturation limit value, $L_{sat}$, at the second input 138 of the distortion calculation unit 136, the first calculated amplitude, $a_1$, is provided at the second input 138. In relation to the third comparator 234, the saturation threshold, $C_{sat}$, is correspondingly increased, for example by the reciprocal of the scaling factor, $\beta_i$. At the output 232 of the third summation unit 228, the output value generated would correspond, for positive values, to the excess amplitude. As such, this measure of excess amplitude can be used to identify saturated pixels and/or modify one or more configuration/setup parameters in order to mitigate or correct the effects of saturation in a like manner to that described above in relation to measures of excess amplitude.

When a pixel is not experiencing saturation, the calculated excess amplitude and the first calculated amplitude, $a_1$, are substantially equal and so the evaluation of the difference between these two values is zero, which is less than the saturation threshold, $C_{sat}$, and so the output of the third comparator 234 yields a logic LOW, for example, as the saturation detection signal indicative of the pixel not being saturated or at saturation. Where the pixel is at saturation, the calculated excess amplitude and the first calculated amplitude, $a_1$, are still substantially equal and so the evaluation of the difference between these two values is zero. As such, the third comparator 234 still yields a logic LOW, for example. However, when the pixel is saturated, the calculated excess amplitude becomes greater than the first calculated amplitude, $a_1$, and so the evaluation of the difference between these two values is non-zero and when the difference is greater than the saturation threshold, $C_{sat}$, the output of the third comparator 234 yields a logic HIGH, for example, as the saturation detection signal indicative of the pixel being saturation.

The skilled person should appreciate that the above-described implementations are merely examples of the various implementations that are conceivable within the scope of the appended claims. Indeed, in relation to the above examples for detecting saturation as a distortion, it should be appreciated that although the use of even harmonic frequency signals has been described, odd harmonic frequency signals can also be employed for saturation detection. In the context of equation (4) above, $i \in N$ as opposed to $i \in 2N$. In relation to the first example set out above concerning the detection of motion artefacts as a distortion, even-numbered harmonic frequency signals can be employed to detect motion artefacts. However, it should be understood that, in that example and others described herein, even numbered harmonic frequencies can include the $0^{th}$ harmonic frequency. Indeed, in that example, the even numbered harmonic frequency signal can be a combination of two or more even numbered harmonic frequency signals as permitted by the number of phase offset values employed, for example a combination of the $0^{th}$ harmonic frequency and the second harmonic frequency.

Although the scaling factor, $\beta$, and the reciprocal of the scaling factor, $\beta^{-1}$, are described herein as being calculated by the distortion determination unit 136, the skilled person should appreciate that such factors can be pre-calculated and stored, for example pre-calculated during a camera setup stage.

What is claimed is:

1. A motion or saturation determination apparatus comprising:
   a light source configured to emit light in accordance with an indirect time of flight measurement technique;
   an optoelectronic device configured to receive an electromagnetic signal and to translate the electromagnetic signal to a plurality of electrical output signals respectively corresponding to a plurality of predetermined phase offset values applied over a frame cycle in accordance with the indirect time of flight measurement technique, the optoelectronic device also being configured to store each of a plurality of electromagnetic signals;
   a signal processing circuit configured to process the plurality of electrical output signals in accordance with the indirect time of flight measurement technique in order to calculate a plurality of measurement vectors substantially in parallel and derived from the plurality of electrical output signals generated over the frame cycle, the plurality of measurement vectors being in respect of a plurality of frequencies, respectively, and comprising a first measurement vector in respect of a fundamental harmonic frequency and a second measurement vector in respect of a non-fundamental frequency; wherein the signal processing circuit is also configured to calculate a scalar relating a first amplitude of the first measurement vector to a second amplitude of the second measurement vector, and to use the scalar to identify motion or saturation in respect of the optoelectronic device over the frame cycle.

2. The apparatus according to claim 1, wherein the motion or saturation is identified by reference to a distortion determination threshold value.

3. The apparatus according to claim 1, wherein the signal processing circuit is configured to calculate a compensated second amplitude of the second measurement vector, the calculation of the compensated second amplitude comprising applying the scalar to the first amplitude of the first measurement vector.

4. The apparatus according to claim 3, wherein the signal processing circuit is further configured to subtract a scaled first amplitude from the second amplitude.

5. The apparatus according to claim 1, wherein the signal processing circuit is configured to calculate a compensated second amplitude of the second measurement vector, the calculation of the compensated second amplitude comprising applying the scalar to the second amplitude of the second measurement vector and the signal processing circuit subtracting the first amplitude from a scaled second amplitude.

6. The apparatus according to claim 1, the signal processing circuit is configured to estimate a true received intensity in respect of the optoelectronic device, estimation of the true received intensity comprising applying a reciprocal of the scalar to the second amplitude of the second measurement vector.

7. A motion detection apparatus comprising:
the motion or saturation determination apparatus according to claim 4; wherein
the non-fundamental frequency is an even-numbered harmonic frequency; and
the signal processing circuit is configured to calculate an absolute value of a result of the subtraction and to compare the absolute value with a distortion determination threshold value.

8. The apparatus according to claim 7, wherein the distortion determination threshold value is a predetermined motion threshold value.

9. A saturation detection apparatus comprising:
the motion or saturation determination apparatus according to claim 4; wherein
the signal processing circuit is configured to compare a result of the subtraction with a distortion determination threshold value.

10. The apparatus according to claim 9, wherein the distortion determination threshold value is a predetermined saturation threshold value.

11. The apparatus according to claim 9, wherein
the optoelectronic device has a saturation limit associated therewith; and
the signal processing circuit is configured to calculate a saturation threshold value constituting the distortion determination threshold value by calculating an available headroom between the second amplitude and the saturation limit of the optoelectronic device.

12. A saturation detection apparatus comprising:
the motion or saturation determination apparatus according to claim 6; wherein
the optoelectronic device has a saturation limit associated therewith; and
the signal processing circuit is configured to calculate a difference between the saturation limit and the true received intensity calculated.

13. A saturation detection apparatus comprising:
the motion or saturation determination apparatus according to claim 2; wherein
the optoelectronic device has a saturation limit associated therewith;
the signal processing circuit is configured to calculate a difference between the saturation limit and a true received intensity;
the signal processing circuit is configured to estimate the true received intensity in respect of the optoelectronic device, estimation of the true received intensity comprising applying a reciprocal of the scalar to the second amplitude of the second measurement vector;
the distortion determination threshold value is a predetermined saturation threshold value; and
the signal processing circuit is configured to compare the difference calculated with the predetermined saturation threshold value.

14. An imaging system comprising:
the saturation detection apparatus according to claim 12; and
an array of optoelectronic devices comprising the optoelectronic device; wherein
the saturation detection apparatus is configured to detect saturation in respect of each optoelectronic device of the array of optoelectronic devices;
the signal processing circuit is configured to execute a first image capture using the array of optoelectronic devices;
the signal processing circuit is configured to statistically analyse calculated differences between the saturation limit and the true received intensity in respect of the array of optoelectronic devices and to identify an area of the array of optoelectronic devices experiencing saturation in respect of the first image capture; and
the signal processing circuit is configured to modify a performance parameter associated with the first image capture, and to execute a second image capture implementing the modified performance parameter.

15. A method of determining motion or saturation in respect of an optoelectronic device for an indirect time of flight range measurement apparatus, the method comprising:
emitting light in accordance with an indirect time of flight measurement technique;
generating and storing a plurality of electrical output signals in response to a received optical signal and respectively corresponding to a plurality of predetermined phase offset values applied over a frame cycle in accordance with the indirect time of flight measurement technique;
processing the plurality of electrical output signals in accordance with the indirect time of flight measurement technique in order to calculate a plurality of measurement vectors substantially in parallel and derived from the plurality of electrical output signals generated over the frame cycle, the plurality of measurement vectors being in respect of a plurality of frequencies, respectively, and comprising a first measurement vector in respect of a fundamental harmonic frequency and a second measurement vector in respect of a non-fundamental frequency; and calculating a scalar relating a first amplitude of the first measurement vector to a second amplitude of the second measurement vector; and using the scalar to identify motion or saturation in respect of the optoelectronic device over the frame cycle.

* * * * *